(12) United States Patent
Strong et al.

(10) Patent No.: US 11,061,807 B2
(45) Date of Patent: Jul. 13, 2021

(54) TRACE MANAGEMENT DURING ABORTED SPECULATIVE OPERATIONS

(71) Applicant: Intel Corporation, Santa Clara, CA (US)

(72) Inventors: Beeman Strong, Portland, OR (US); Matthew C. Merten, Hillsboro, OR (US); Jason Agron, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 16/235,489

(22) Filed: Dec. 28, 2018

(65) Prior Publication Data

US 2020/0210320 A1 Jul. 2, 2020

(51) Int. Cl.
*G06F 11/00* (2006.01)
*G06F 11/36* (2006.01)

(52) U.S. Cl.
CPC .................. *G06F 11/3636* (2013.01)

(58) Field of Classification Search
CPC . G06F 11/323; G06F 11/3636; G06F 11/3466
See application file for complete search history.

(56) References Cited

U.S. PATENT DOCUMENTS

| 9,442,729 B2 | 9/2016 | Strong et al. |
| 2006/0112261 A1* | 5/2006 | Yourst .................. G06F 9/3857 712/218 |
| 2011/0314264 A1* | 12/2011 | Horley ................ G06F 11/3636 712/227 |
| 2016/0224348 A1 | 8/2016 | Agron et al. |
| 2016/0378498 A1 | 12/2016 | Caprioli et al. |
| 2018/0276052 A1* | 9/2018 | Kim ........................ G06F 11/22 |

OTHER PUBLICATIONS

Google Scholar/Patents—text refined (Year: 2020).*
Google Patents/Scholar—text refined (Year: 2021).*

* cited by examiner

*Primary Examiner* — Christopher S McCarthy
(74) *Attorney, Agent, or Firm* — NDWE LLP

(57) ABSTRACT

A method for tracing software code executing on a core of a processor is described. The method includes generating a set of packets for a trace packet stream based on a main cycle counter, which maintains a count of cycles elapsing in the core since a packet was emitted into the trace packet stream, and a commit cycle counter, which maintains a cycle count in the core since the last commit operation, wherein the generating comprises (1) storing a value of the main cycle counter in the commit cycle counter in response to detecting a commit operation and (2) storing a value of the commit cycle counter in the main cycle counter in response to detecting an abort in the core; and emitting the set of packets from the processor into the trace packet stream for tracing execution of the software code.

17 Claims, 13 Drawing Sheets

TRACE MANAGEMENT DURING ABORTED SPECULATIVE OPERATIONS

FIELD OF INVENTION

The field of the invention relates generally to trace management. More specifically, the field of the invention relates to trace management during aborted speculative operations.

BACKGROUND

Tracing, in the context of software engineering, involves logging/recording trace information about a program's execution. This trace information can be used by programmers for debugging and/or performance analysis in relation to the program's execution on a processor/core. The trace information can include control flow data, which describes a path through instructions of the program, and timing data, which describes the time/cycles taken at different stages of the program for execution. To properly debug the program and perform a performance analysis, it is critical that the control flow data and the timing data accurately represent the program's execution. However, ensuring the accuracy of trace information may be complicated during speculative execution of instructions in which logged/recorded cycles may be lost during an abort.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
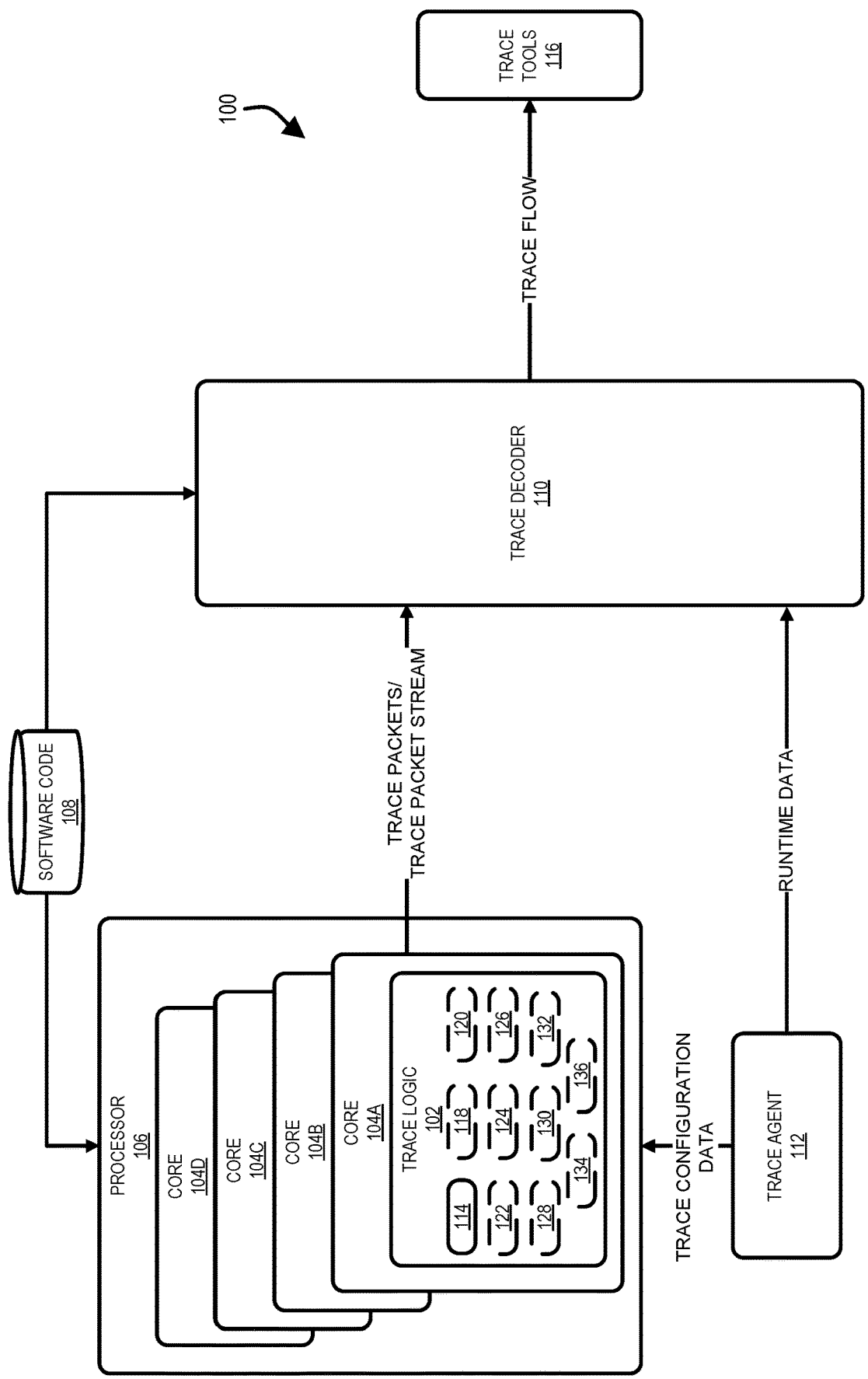
FIG. 1 shows a trace system, according to one example embodiment.

FIG. 1 shows a trace system 100, according to one example embodiment. The trace system 100 allows the capture of information about software/program execution such that later analysis of the execution can be performed (e.g., a debugging/error analysis and/or a performance analysis). For example, trace logic 102 operating on core 104A, in a set of cores 104A-104D of a processor 106, may be executing software code 108 (sometimes referred to as software, code, or a program), which includes a set of instructions to be executed by the core 104A. As instructions in the set of instructions of the software code 108 retire, the trace logic 102 may determine trace information for the retired instructions, which may be later used for analyzing the execution flow, including the performance, of the software code 108. The trace information may exclude certain aspects/details of the execution of the software code 108 by the core 104A.

In particular, execution of the software code 108 by the core 104A may generate or otherwise be associated with static information and dynamic information. Static information is information regarding execution of the software code 108 that can be gleaned directly from the software code 108 itself (i.e., without execution of the software code 108). For example, a direct jump/branch instruction identifies a particular label/address in the software code 108. Accordingly, jumping/branching by the core 104A to a particular label in the software code 108 in response to a direct jump/branch instruction is considered static information because the direct jump/branch will always be taken (i.e., there is no conditional aspect) and the target is known prior to execution (i.e., the target is always the label identified by the jump/branch instruction). Since static information can be gleaned from the software code 108 itself and without execution of the software code 108, as illustrated by the above example, corresponding trace information does not need to be generated to represent this static information. Instead, static information can be gleaned from the software code 108 itself during a later analysis.

In contrast, dynamic information is information regarding program flow that can only be discerned at runtime of the software code 108. For example, examining an indirect branch instruction in the software code 108, which includes a target specified in a register or memory location identified by the indirect branch instruction, does not indicate the eventual target of the indirect branch instruction. Namely, the target of the indirect branch instruction can only be discerned at runtime by examining the contents of the specified register/memory location or otherwise witnessing the flow of the software code 108 as executed by a core 104. Accordingly, trace information for indirect branches needs to include the target, which is determined at the time of execution, such that a proper trace of the execution of the software code 108 can be later determined. For example, trace information for an indirect branch may include a TIP packet, which indicates a target for the indirect branch. For a conditional branch, where the branch is only taken when a specified condition is met, the trace information needs to indicate whether the branch is taken or not taken such that a proper trace of the execution of the software code 108 can be later determined. For example, trace information for a conditional branch may include a taken-not-taken (TNT) packet, which indicates whether the conditional branch was taken (i.e., the condition of the conditional branch was met) or was not taken (i.e., the condition of the conditional branch was not met).

In some embodiments, dynamic trace information may include timing information related to the execution of the software code 108. For example, the core 104A may devote a certain number of cycles to execution of an instruction or otherwise processing the software code 108. As will be discussed in greater detail below, the trace logic 102 may utilize a cycle counter to keep track of spent cycles and generate cycle (CYC) packets to represent these spent cycles in the trace information. Since dynamic information cannot be gleaned from the software code 108 itself and without execution of the software code 108, as illustrated by the above examples, corresponding trace information needs to be generated to represent this dynamic information, which includes CYC packets.

After generating trace information, the trace logic 102 may buffer the trace information (e.g., dynamic trace information) in the core 104A until a sufficient amount of trace information has been generated. For example, the core 104A may include a trace information buffer 114, which may be part of or separate from the trace logic 102, that queues trace information. Upon occurrence of an event (e.g., the trace information buffer 114 being filled, the decoder 110 is ready/available to accept trace packets, etc.), an event is signaled by the trace logic 102 and trace packets (e.g., TNT, TIP, and CYC packets) are thereafter transmitted to a trace decoder 110 for processing. In particular, the trace decoder 110 receives the software code 108 along with a set of trace packets such that the trace decoder 110 can generate a trace flow that can be used to precisely reconstruct the execution flow of the software code 108. For example, when the trace information buffer 114 is one-kilobyte in size, upon filling the trace information buffer 114 with one-kilobyte of trace information, an event signaled by the trace logic 102 may temporarily halt execution of the software code 108 on the core 104A such that the packets in the trace information buffer 114 are transmitted to the trace decoder 110. Following transmission of the trace information, software code 108 execution can resume on the core 104A along with generating/logging new trace information. The trace flow generated by the trace decoder 110 can be used by the trace tools 116 for later analyzing execution of the software code 108, including conducting a performance analysis.

In some embodiments, the trace decoder 110 may also receive runtime data, which describes the operating conditions under which the software code 108 was executed. For example, a trace agent 112 may serve various functions in relation to tracing the software code 108. For instance, the trace agent 112 may selectively enable tracing by each of the cores 104A-104D. Namely, when tracing is determined to be supported by the processor 106 (i.e., a central processing unit (CPU) identifier (CPUID) of the processor 106 indicates that tracing is supported per core 104), the trace agent 112 may transmit trace configuration data for enabling and/or configuring tracing by one or more of the cores 104A-104D.

The trace agent 112 may also deliver operating condition information, which is related to the execution of the software code 108 on a corresponding core 104, to the trace decoder 110. The operating condition information may include clock frequency of a core 104; a CR3 value, which is associated with the base of a page table base and consequently a process being run by a core 104; a 32-bit or 64-bit mode indication for interpreting instructions of the software code 108; etc. This operating condition information may be delivered to the trace decoder 110 along with the software code 108 and one or more trace packets such that the trace decoder 110 can generate the trace flow that reconstructs the precise execution flow of the software code 108. Some pieces of operating condition information may be used for properly analyzing instructions of the software code 108 that are currently being executed (e.g., a CR3 value and a 32-bit or 64-bit mode indication). For example, these pieces of operating condition information may be useful in analyzing control flow of the software code 108. In contrast, other pieces of operating condition information may be utilized for later analyzing performance of execution of the software code 108. For example, frequency and timing information may be useful in analyzing performance of execution of the software code 108 on a core 104.

In some embodiments, one or more components of the trace system 100 may be implemented using a combination of software and hardware elements. For example, the trace agent 112, the trace decoder 110, and the trace tools 116 may be implemented using software.

As described above, the core 104A may execute instructions of the software code 108 and upon retirement of the instructions, the trace logic 102 may generate trace information as appropriate (e.g., generate TNT, TIP, and/or CYC packets). In certain situations, the core 104A may attempt to perform translation of the software code 108 to optimize performance of the software code 108. In particular, a translator of the core 104A, when generating an optimized translation of the software code 108, creates bundles/transactions of optimized instructions from the software code 108. For example, a group of instructions are translated/optimized into a transaction and the transaction is executed atomically by the core 104A. Upon successfully executing the transaction, the instructions within the transaction are retired and committed such that the next transaction of translated instructions can be executed.

In certain situations, a transaction may be aborted following retirement, and corresponding instructions are not committed. For example, upon making an incorrect assumption regarding a branch, a transaction may be aborted and the core 104A will attempt to revert to a known/safe location/state prior to the beginning of the aborted transaction. Depending on the specifics of the situation, the core 104A may attempt the transaction again, revert to non-optimized/native instructions/code, or some similar action.

In situations involving translations/optimizations of the software code 108, the trace logic 102 should ensure that the trace information still accurately represents the execution by the core 104A, including time devoted to successful or unsuccessful optimization without necessarily revealing the underlying translation/optimization. Namely, a user may not be concerned with details of translation/optimization of the software code 108 but should be made aware of (1) the actual control path through the software code 108 and (2) all elapsed time during which the software code 108 was being executed, even when that time includes wasted translation/optimization cycles (e.g., time/cycles devoted to an aborted transaction). Thus, dynamic information related to the control path through the software code 108 should be eliminated from the trace information when this information does not reflect the actual control path, while still keeping trace information related to elapsed time during execution of the software code 108.

As will be described in greater detail below, the trace logic 102 may include one or more of a trace information buffer 114, a main cycle counter 118, a commit cycle counter 120, a Core:Bus Ratio (CBR) buffer 122, a cycle counter buffer 124, a commit pointer 126, a write pointer 128, a main TNT buffer 130, a commit TNT buffer 132, a main Call-Depth Counter (CDC) buffer/value 134, and a commit CDC buffer/value 136. Each of these elements may be used for maintaining an accurate or an otherwise consistent view/representation of execution of the software code 108 even after the occurrence of an unexpected event (e.g., an abort).

Figure 2:
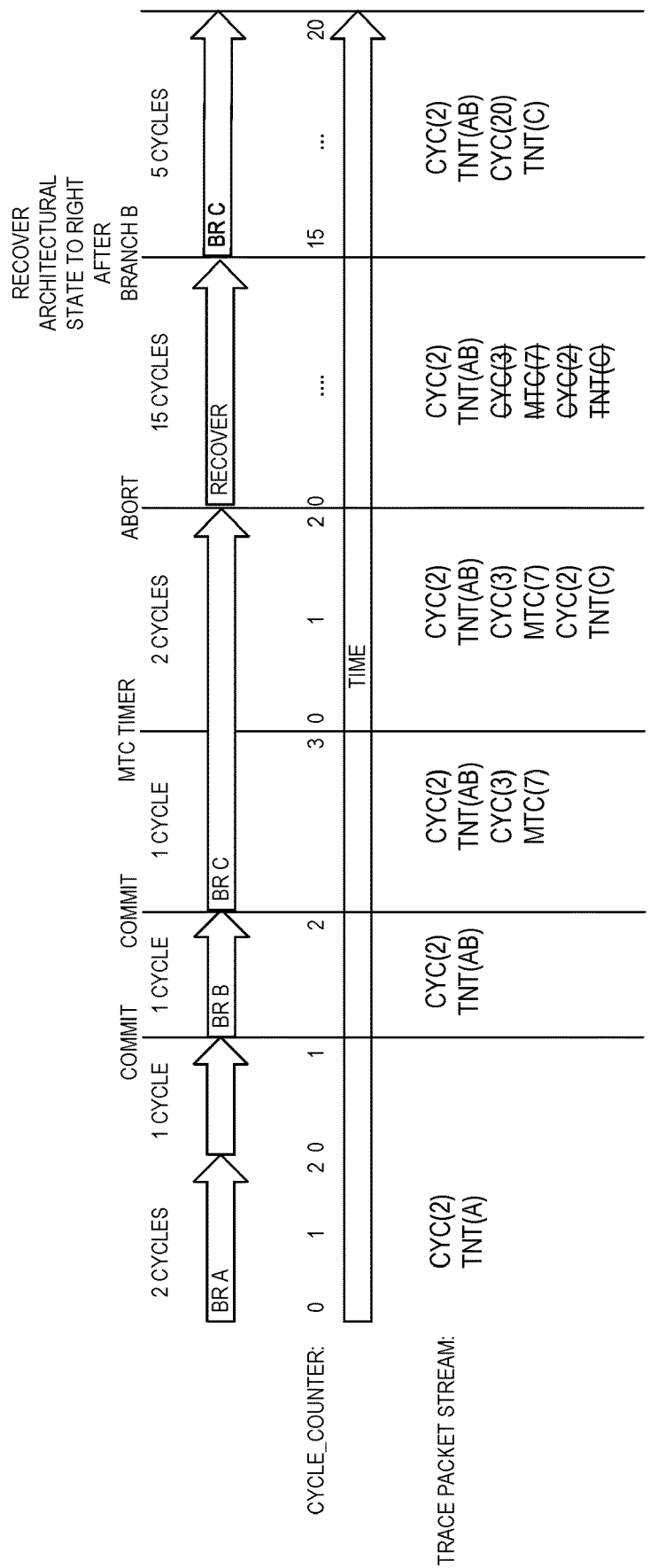
FIG. 2 shows a trace packet stream that uses a single cycle counter, according to one example embodiment.

FIG. 2 shows an example situation in which CYC packets are used to track cycles in the tracing system 100. In particular, FIG. 2 shows a trace packet stream that is generated by trace logic 102 of the core 104A, including a set of packets (e.g., TNT and CYC packets), based on execution of the software code 108. Execution of the software code 108 may include optimization and/or speculative execution of instructions. As shown in FIG. 2, a cycle counter counts processor/core cycles since the last packet that is written to the trace packet stream (i.e., written to the trace information buffer 114). The cycle counter may count cycles as they elapse during execution of the software code 108 and can be periodically reset by the trace logic 102 (e.g., reset after a new trace packet is added to the trace packet stream). For example, the conditional Branch A (i.e., BR A) is retired in the core 104A, which causes a taken-not-taken (TNT) packet to be generated that indicates whether conditional Branch A was taken or not taken. In addition to the TNT packet for conditional Branch A (i.e., TNT(A), where A indicates whether conditional Branch A was taken or not taken), the trace logic 102 may also generate a cycle (CYC) packet, which indicates the current value of the cycle counter. In this case, the cycle counter has a value of two. Thus, a CYC packet with a value of two (i.e., CYC(2)) is added to the trace packet stream along with the TNT packet for conditional Branch A (i.e., TNT(A)). The cycle counter is reset after adding the CYC packet to the trace packet stream and thereafter the cycle counter begins being incremented (e.g., sets the value of the cycle counter to one during the next cycle and/or sets the value of the cycle counter to zero such that the cycle counter can be incremented to one in the next cycle). As illustrated above, in response to adding a new packet to the trace packet stream, which describes the flow through the software code 108, a corresponding CYC packet may be added to the trace packet stream to reflect the time/cycles elapsed since the last CYC packet in the trace packet stream and the cycle counter may be reset.

Following committal of conditional Branch A, the core 104A may move on to conditional Branch B. Conditional Branch B is processed by the core 104A, but after retirement of conditional Branch B, a new packet is not necessary for the packet stream as the original TNT packet used for conditional Branch A (i.e., TNT(A)) can include up to six entries corresponding to six separate conditional branches. Accordingly, instead of generating a new TNT packet for conditional Branch B (i.e., BR B), a value B is added to the previous TNT packet to account for the retirement of conditional Branch B. In particular, the packet TNT(A) is modified to be TNT(AB), where B indicates whether conditional Branch B was taken or not taken. Since a new packet has not been added to the trace packet stream, a corresponding CYC packet also does not need to be added to the trace packet stream. Modifying a previous TNT packet, in comparison to adding a new TNT packet in addition to another CYC packet, allows for greater compression of data in the packet stream. Since a new trace packet was not generated for conditional Branch B (i.e., the previous TNT packet was modified instead of adding a new TNT packet), a new CYC packet is not needed and the cycle counter is permitted to continue tracking cycles since the original TNT packet was added to the trace packet stream (i.e., the cycle counter is not reset).

Following committal of conditional Branch B, the core 104A may move on to conditional Branch C (i.e., BR C). During the processing of conditional Branch C, the mini-time counter (MTC) has expired, which results in a MTC packet (i.e., MTC(7)) being added to the packet stream. As used herein, an MTC packet is a periodic time packet that is generated based on a specified MTC time period. In response to generating a new packet for addition to the trace packet stream, the trace logic 102 also generates a new CYC packet. Since the cycle counter has now reached a value of three, the CYC packet includes a value of three (i.e., CYC(3)). Addition of the MTC packet and a CYC packet ends the use of the previous TNT packet for additional conditional branches. In particular, although TNT packets can hold values for up to six conditional branches, the addition of the MTC packet and the CYC packet prevents further modification of TNT(AB) to account for future conditional branches. Instead, a new TNT packet will be needed for future conditional branches.

After retirement of conditional Branch C and just prior to a commit instruction, the trace logic 102 generates a CYC packet based on the current value of the cycle counter (i.e., the cycle counter has a value of three, which corresponds to CYC(3)), resets the cycle counter, and generates a TNT packet for Branch C (i.e., TNT(C)). However, prior to a commit instruction, an abort occurs in the core 104A, which causes the core 104A to revert back to a previous committed state. In particular, the core 104A reverts back to the state just after committal of conditional Branch B. Accordingly, the speculative packets CYC(3), MTC(7), CYC(2), and TNT(C) are eliminated from the trace packet stream as the core 104A reverts to the previous committed state. The core 104A then proceeds to recover from the abort, which takes fifteen cycles, and thereafter again attempts to process the conditional Branch C.

The second attempt at processing conditional Branch C is successful, which causes the generation of a CYC packet corresponding to the current value of the cycle counter (i.e., CYC(20)) and a TNT packet representing conditional Branch C (i.e., TNT(C)). The CYC(20) packet accounts for the time between the abort and the retirement of conditional Branch C. However, as shown in FIG. 2, the abort operation has caused some cycles of time to not be represented in the trace packet stream. Namely, there are five cycles that are not represented in the trace packet stream. These five cycles correspond to the CYC(3) and CYC(2) packets that were eliminated from the trace packet stream upon the abort operation. Although conditional Branch C was eventually properly executed and retired, the trace packet stream does not account for the time devoted by the core 104A originally attempting to process this branch. Namely, the execution of Branch A, Branch B, and Branch C is represented by twenty-two cycles in FIG. 2, but twenty-seven cycles actually elapsed. Accordingly, a user analyzing the trace packet stream via the trace decoder 110 and/or the trace tools 116 will not be aware of these lost five cycles.

As exemplified above, a transaction abort may lead to lost trace information that is critical in later understanding the execution of the software code 108. As described below, internal state information of the core 104A related to execution of the software code 108 may be stored/buffered for later recovery upon occurrence of an abort in several scenarios.

For instance, in the example provided above, state information related to a cycle counter may be needed to understanding the execution of the software code 108 following recovery from an abort. In particular, to better account for cycles during a trace, in one example embodiment, a commit cycle counter (Commit_Cycle_Counter) is provided along with a main cycle counter (Main_Cycle_Counter). The commit cycle counter is sized to match that of the main cycle counter with which it is paired (e.g., each of the commit cycle counter and the main cycle counter may be twelve to nineteen bits in length). However, the behavior of the commit cycle counter is different from that of the main cycle counter and that of the cycle counter of FIG. 2. In particular, during each cycle, when a CYC packet is being emitted into the trace packet stream (e.g., in response to a branch instruction retiring), the value of the main cycle counter is reset. Otherwise, when a CYC packet is not being emitted into the trace packet stream, the value of the main cycle counter is set to the minimum of one more than the current value of the main cycle counter (i.e., Main_Cycle_Counter+1) and the upper limit of the main cycle counter (i.e., Main_Cycle_Counter=Min(Main_Cycle_Counter+1, LIMIT$_{MCC}$)). Accordingly, during each cycle the main cycle counter either (1) resets or (2) increments based on the last/current value of the main cycle counter while accounting for saturation of the main cycle counter. Further, during each cycle, when the trace packet stream is in a speculative region (i.e., a commit has not yet occurred for a set of retired, speculative instructions), the value of the commit cycle counter is equal to the minimum of one more than the current commit cycle counter (i.e., Commit_Cycle_Counter+1) and the upper limit of the commit cycle counter (i.e., Commit_Cycle_Counter=Min(Commit_Cycle_Counter+1, LIMIT$_{CCC}$)). Accordingly, during each cycle, the commit cycle counter counts based on the last/current value of the commit cycle counter while accounting for saturation of the commit cycle counter. In other words, the commit cycle counter counts as if the current transaction will abort and all added CYC packets since the last commit will be thrown away. In some embodiments, the commit cycle counter is only tracked/incremented for speculative regions such that power/resources can be conserved by the processor 106.

In response to a commit instruction, the commit cycle counter is set equal to the value of the main cycle counter (i.e., Commit_Cycle_Counter=Main_Cycle_Counter). Accordingly, the commit cycle counter stores a snapshot count of the main cycle counter since the last committed CYC packet.

In response to an abort operation (e.g., a speculative region abort that causes the core 104A to revert to a previously committed state), the main cycle counter is set equal to the value of the commit cycle counter (i.e., Main_Cycle_Counter=Commit_Cycle_Counter). Accordingly, the main cycle counter can begin counting/incrementing from the last committed CYC packet.

Using the above technique, the main cycle counter is reset when CYC packets are emitted/generated (e.g., in response to a branch instruction retiring), but the commit cycle counter is not reset and maintains the count since the last committed CYC packet. Using this mechanism, the commit cycle counter serves as a backup for the main cycle counter. This ensures that all cycles, up to the max value of the commit cycle counter, are included in the trace/packet stream regardless of potential aborts.

Figure 3:
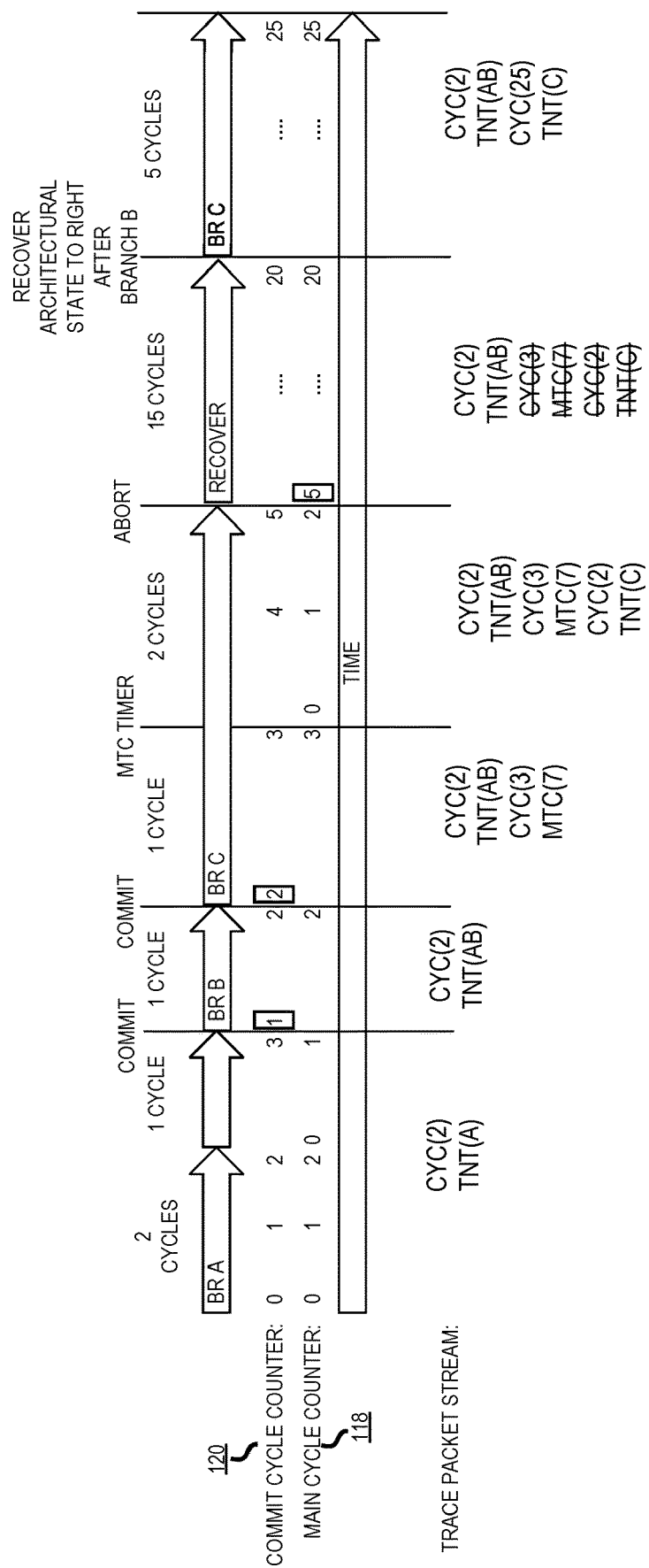
FIG. 3 shows a trace packet stream using both a main cycle counter and a commit cycle counter, according to one example embodiment.

FIG. 3 shows an example trace packet stream using both the main cycle counter 118 and the commit cycle counter 120, which operate as described above. In this illustration, counter snapshots in either the main cycle counter 118 or the commit cycle counter 120 are shown with an outlining box. As shown in FIG. 3, the conditional Branch A is initially processed and retired in the core 104A, which causes a TNT packet to be generated that indicates whether conditional Branch A was taken or not taken. Both the commit cycle counter 120 and the main cycle counter 118 are incremented as cycles elapse. In addition to the TNT packet for conditional Branch A (i.e., TNT(A), where A indicates whether the conditional Branch A was taken or not taken), the trace logic 102 may also generate a CYC packet, which indicates the current value of the main cycle counter 118. In this case, the main cycle counter 118 has a value of two. Thus, a CYC packet with a value of two (i.e., CYC(2)) is added to the trace packet stream along with the TNT packet for conditional Branch A (i.e., TNT(A)). The main cycle counter 118 is reset after adding the CYC packet to the trace packet stream and thereafter begins being incremented (e.g., sets the value of the main cycle counter 118 to one during the next cycle and/or sets the value of the main cycle counter 118 to zero such that the main cycle counter 118 can be incremented to one in the next cycle). In contrast to the main cycle counter 118, the commit cycle counter 120 continues to count without a reset operation (i.e., the commit cycle counter 120 counts as if the CYC packets generated by the main cycle counter 118 will be aborted and dropped). Accordingly, after another cycle since retirement of conditional Branch A and just prior to a commit, the main cycle counter 118 has a value of one while the commit cycle counter 120 has a value of three. Upon the commit operation and beginning a new speculative region, the commit cycle counter 120 is set equal to the main cycle counter 118 (i.e., Commit_Cycle_Counter=Main_Cycle_Counter) such that both the main cycle counter 118 and the commit cycle counter 120 begin incrementing from the same value (e.g., the value one). Accordingly, the commit cycle counter 120 now stores a snapshot of the main cycle counter 118.

Following committal of conditional Branch A, the core 104A may move on to conditional Branch B. Accordingly, Branch B is processed by the core 104A and after retirement of conditional Branch B the packet TNT(A) is modified to be TNT(AB), where B indicates whether the conditional Branch B was taken or not taken. As noted above, modifying a previous TNT packet, in comparison to adding a new TNT packet in addition to another CYC packet, allows for greater compression of data in the trace packet stream. Since a new trace packet was not generated for conditional Branch B (i.e., the previous TNT packet was modified instead of adding a new TNT packet), a new CYC packet is not needed and the main cycle counter 118 and the commit cycle counter 120 are permitted to continue tracking cycles without a reset since the original TNT packet was added to the trace packet stream.

Following committal of conditional Branch B, the commit cycle counter is set equal to the main cycle counter 118 (i.e., Commit_Cycle_Counter=Main_Cycle_Counter) such that the commit cycle counter 120 again stores a snapshot of the main cycle counter 118. Further, the core 104A may move on to conditional Branch C. During the processing of Branch C, the MTC has expired, which results in a MTC packet (i.e., MTC(7)) being added to the packets stream. In response to generating a new trace packet for addition to the trace packet stream, the trace logic 102 also generates a new CYC packet. Since the main cycle counter 118 has now reached a value of three, the CYC packet includes a value of three (i.e., CYC(3)). Addition of the MTC packet and a CYC packet ends the use of the previous TNT packet for additional conditional branches. Instead, a new TNT packet will be needed for future conditional branches. Additionally, since a new trace packet has been added to the trace packet stream, the main cycle counter 118 is reset; however, the commit cycle counter 120 can continue incrementing each cycle (i.e., without a reset).

After retirement of conditional Branch C and just prior to a commit, the trace logic 102 generates a CYC packet based on the main cycle counter value 118 (i.e., the main cycle counter 118 has a value of two, which corresponds to CYC(2)), resets the main cycle counter 118, and generates a TNT packet for Branch C (i.e., TNT(C)). However, prior to a commit, an abort was generated in the core 104A, which causes the core 104A to revert back to a previous committed state. In particular, the core 104A reverts back to the state just after committal of Branch B. Accordingly, the speculative packets CYC(3), MTC(7), CYC(2), and TNT(C) are eliminated from the packet stream as the core 104A reverts to the previous committed state. In response to this abort, the main cycle counter 118 is set equal to the commit cycle counter 120 (i.e., Main_Cycle_Counter=Commit_Cycle_Counter). Accordingly, both the main cycle counter 118 and the commit cycle counter 120 have a value of five. Thus, any later generated timing packets (e.g., CYC packets) can maintain the correct cycle count from the previous committal. In particular, after the abort, the core 104A then proceeds to recover, which takes fifteen cycles that are added/incremented by the main cycle counter 118 and the commit cycle counter 120 based on the five cycles since the last commit instruction, and thereafter again attempts to process the conditional Branch C.

Accordingly, as shown in FIG. 3, the second attempt at processing conditional Branch C is successful, which causes the generation of a CYC packet corresponding to the current value of the main cycle counter 120 (i.e., CYC(25)) and a TNT packet representing conditional Branch C (i.e., TNT (C)). As shown in FIG. 3 and in contrast to the example of FIG. 2, the CYC(25) packet accounts for all the cycles in the timeline. Namely, the five cycles that are not represented in the trace packet stream of FIG. 2 are represented in the trace packet stream of FIG. 3. Accordingly, a more accurate representation of execution can be shown to a user via the trace decoder 110 and/or the trace tools 116.

Figure 4:
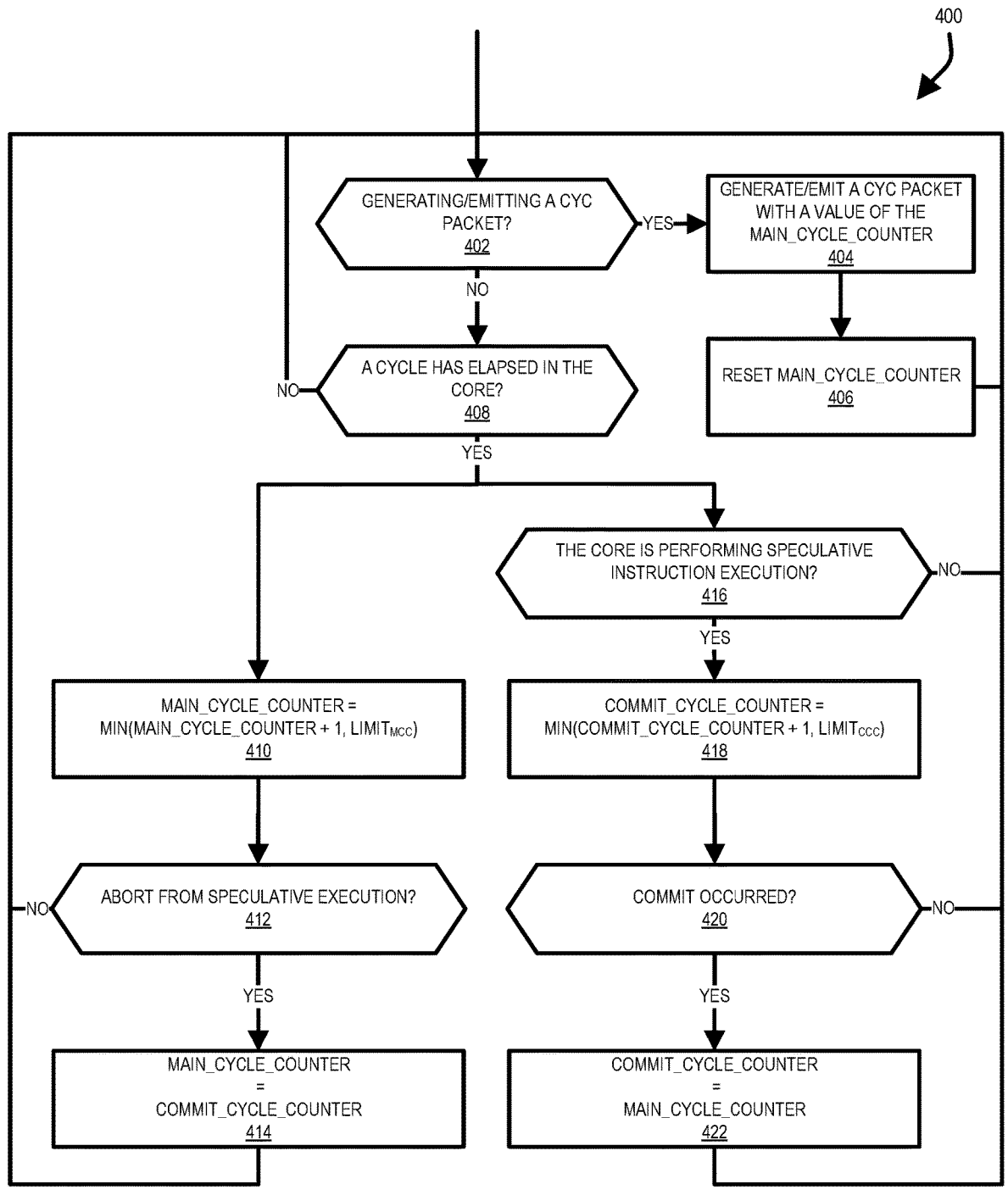
FIG. 4 shows a method for managing state information for a core, and in particular managing cycle accounting in a core when tracing aborted speculative instructions using the main cycle counter and the commit cycle counter, according to one example embodiment.

Turning now to FIG. 4, a method 400 will be described for managing state information for the core 104A, and in particular managing cycle accounting in the core 104A, when tracing aborted speculative instructions, according to one example embodiment. The operations in the flow diagram will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagrams. For example, although described in relation to the core 104A, the method 400 may be performed by each of the cores 104A-104D and each of the logical processors (SMT) of the processor 106.

As shown in FIG. 4, the method 400 may commence at operation 402 with the trace logic 102 determining whether a CYC packet is to be generated and/or emitted into a trace packet stream. For example, the cores 104A may be executing the software code 108 and the trace logic 102 may be tracking execution of the software code 108 for generation of trace packets for the trace packet stream. Upon adding a new TNT or TIP packet to the trace packet stream, the trace logic 102 may also determine to add a CYC packet to the trace packet stream. In response to determining that a CYC packet is to be emitted into the trace packet stream, the method 400 moves to operation 404.

At operation 404, the trace logic 102 generates and emits a CYC packet into the trace packet stream and the emitted CYC packet includes the current value of the main cycle counter 118. For example, when the main cycle counter 118 has a value of two, the CYC packet emitted/added to the trace packet stream includes the value of two (e.g., CYC(2)). Thereafter, the trace logic 102 resets the value of the main cycle counter 118 at operation 406 (e.g., sets the value of the main cycle counter 118 to one during the next cycle and/or sets the value of the main cycle counter 118 to zero such that the main cycle counter 118 can be incremented to one in the next cycle) and returns to operation 402.

Returning to operation 402, when the trace logic 102 determines that a CYC packet is not to be generated/emitted into the trace packet stream, the method 400 moves to operation 408. At operation 408, the trace logic 102 determines whether a cycle has elapsed in a corresponding core 104A. Upon determining that a cycle has not elapsed, the method 400 returns to operation 402 to await the generation/emission of a CYC packet and/or a cycle to elapse.

Conversely, upon determining that a cycle has elapsed at operation 408, the method moves to operations 410 and 416. The set of operations beginning with operation 410 (i.e., operations 410, 412, and 414) are used for managing/modifying the main cycle counter 118, while the set of operations beginning with operation 416 (i.e., operations 416, 418, 420, and 422) are used for managing/modifying the commit cycle counter 120. Each set of operations may be performed in partially or fully overlapping time periods.

Beginning with the set of operations for managing/modifying the main cycle counter 118 (i.e., operations 410, 412, and 414), the trace logic 102 sets the value of the main cycle counter 118 to the minimum of one more than the current value of the main cycle counter 118 (i.e., Main_Cycle_Counter+1) and the upper limit of the main cycle counter 118 (i.e., Main_Cycle_Counter=Min(Main_Cycle_Counter+1, $LIMIT_{MCC}$)) at operation 410. In some embodiments, in response to reaching the $LIMIT_{MCC}$, a CYC packet is emitted into the trace packet stream using the main cycle counter 118 and the main cycle counter 118 is reset to account for the overflow/saturation. However, the commit cycle counter 120 may continue counting and surpass the value of the main cycle counter 118.

Following operation 410, the trace logic 102 determines if an abort from speculative execution of instructions in the core 104A has occurred at operation 412. In response to determining that an abort from speculative execution of instructions in the core 104A has not occurred, the method 400 returns to operation 402. However, in response to determining that an abort from speculative execution of instructions in the core 104A has occurred (e.g., a speculative region abort that causes the core 104A to revert to a previously committed state), the method 400 moves to operation 414. At operation 414, the trace logic 102 sets the main cycle counter 118 equal to the value of the commit cycle counter 120 (i.e., Main_Cycle_Counter=Commit_Cycle_Counter). Accordingly, the main cycle counter 118 can begin counting/incrementing from the last committed CYC packet and the method 400 returns to operation 402.

Although the method 400 is being described in relation to using a processor tracing mechanism (e.g., the architecture shown in FIG. 1), in some embodiments, different techniques can be utilized to monitor control flow through the software code 108. For example, using a set of registers (e.g., a set of thirty-two registers), the core 104A can keep track of the last taken branches (e.g., the last thirty-two taken branches) by storing information in a set of registers of the core 104A (e.g., the address of the branch, the target of the branch, and metadata associated with the branch can be stored in last branch records (LBRs)).

In some embodiments, the commit cycle counter 120 could apply for the tracing mechanism/technique shown in FIG. 1, but not for LBRs. In these embodiments, on an abort a CYC packet is generated using the value of the commit cycle counter 120 (e.g., CYC(Commit_Cycle_Counter)) and the commit cycle counter 120 is reset (i.e., Commit_Cycle_Counter=0). This avoids the need to set the main cycle counter 118 equal to the commit cycle counter 120, by instead generating a stand-alone CYC packet that includes the cycles that passed during the aborted code section. However, in some cases this would require flushing pending packets (e.g., a not yet full TNT packet).

As noted above, the set of operations beginning at operation 416 (i.e., operations 416, 418, 420, and 422) are used for managing/modifying the commit cycle counter 120. Beginning at operation 416, the trace logic 102 determines whether the core 104A is performing speculative instruction execution. In response to determining that the core 104A is not performing speculative instruction execution, the method 400 may return to operation 402. In particular, since speculative instruction execution is not being performed, the method 400 does not need to manage the value of the commit cycle counter 120 and resources can be reserved in relation to the commit cycle counter 120.

Conversely, in response to determining that the core 104A is performing speculative instruction execution, the method 400 may move to operation 418. At operation 418, the trace logic 102 sets the value of the commit cycle counter 120 equal to the minimum of one more than the current value of the commit cycle counter 120 (i.e., Commit_Cycle_Counter+1) and the upper limit of the commit cycle counter 120 (i.e., Commit_Cycle_Counter=Min(Commit_Cycle_Counter+1, $LIMIT_{CCC}$)).

If the commit cycle counter 120 saturates before either a commit instruction or an abort operation occurs, the saturated value can be retained until the value is either overwritten (e.g., in response to a commit instruction) or recorded in response to the next abort operation. However, this will result in the loss of cycles (i.e., the packet stream will not accurately represent all cycles spent by the core 104A). Thus, if an abort is encountered while the commit cycle counter is saturated, an overflow (OVF) packet can be inserted into the trace packet stream to indicate that trace information was lost. In some embodiments, the commit cycle counter 120 may be determined to be larger than the main cycle counter 118 to account for these cases. If the commit cycle counter 120 value is larger than allowed in a CYC packet, multiple CYC packets can be inserted into the trace packet stream back-to-back.

Following operation 418, the trace logic 102 determines at operation 420 whether a commit operation has occurred in the core 104A. In response to determining that a commit has not occurred in the core 104, the method 400 returns to operation 402. In some embodiments, speculative execution commences with a commit operation. Although there is nothing to commit since prior execution was in a normal/non-speculative execution mode, detection of the commit does cause the commit cycle counter 120 to be synced with the main cycle counter 118. Accordingly, operation 416 may be removed from the method 400 or operation 416 can be replaced with detecting whether a commit has occurred (i.e., when a commit is determined to have occurred, the method 400 moves to operation 418).

Conversely, in response to determining that a commit has occurred in the core 104A, the method 400 moves to operation 422. At operation 422, the trace logic 102 sets the commit cycle counter 120 equal to the current value of the main cycle counter 118 (i.e., Commit_Cycle_Counter=Main_Cycle_Counter). Accordingly, the commit cycle counter 120 stores a snapshot count of the main cycle counter 118 since the last committed CYC packet.

As described above, the commit cycle counter 120 may work in conjunction with the main cycle counter 118 to maintain internal state information (e.g., an accurate cycle count) even in view of unexpected events, such as an abort operation. In particular, the commit cycle counter 120 can store a snapshot of the main cycle counter in response to a commit, such that the main cycle counter 118 can revert to this snapshot value upon occurrence of an abort (or another similar event) and begin counting/incrementing from the last commit (i.e., begin counting/increment from the last committed CYC packet).

Although the trace packets described above are dropped after an abort, some packets generated during an aborted transaction cannot simply be dropped as the loss of these packets will obscure the events or the performance of the executed software code 108. These include packets that indicate time or clock frequency of the core 104A, since those values apply regardless of a commit or an abort. For example, in response to a Core:Bus Ratio (CBR) packet being generated by a clock frequency change in the core 104A that took place during a transaction, the trace logic 102 may set a CBR bit. If the transaction is aborted, the CBR bit indicates to the trace logic 102 that a CBR packet must be re-inserted after the roll-back, such that the clock frequency change remains present/represented in the trace information. If the transaction is not aborted, the CBR bit is cleared on retire of a commit instruction.

If CYC packets are enabled in the core 104A, a CBR packet will be accompanied by a CYC packet, which provides the time of the clock frequency change. This is used by the trace decoder 110 to determine the amount of time (i.e., wall-clock time) that passes for each processor/core cycle represented in the CYC packets. If a transaction that included a frequency change is aborted, and hence the CBR packet is re-inserted at/after time of abort, additional measures must be taken to get the cycle time associated with the CBR packet correct. For example, at the time of CBR packet generation, a commit CYC time can be buffered along with the CBR value and the commit CYC counter is then reset. If and when the transaction aborts, CYC packets and CBR packets holding the buffered values are inserted in the packet stream.

In some embodiments, it is possible that the microarchitecture will allow multiple clock frequency changes to occur within a single transaction. To maintain proper timing fidelity within the trace packet stream, multiple saved CYC and CBR values may be required that add to cost and complexity. In some embodiments, the number of clock frequency changes that can occur within a transaction is limited to one or to the number of saved CYC and/or CBR buffers supported. Alternatively, upon an abort of a transaction that included more frequency changes than the hardware could buffer, an overflow (OVF) packet can be emitted into the trace packet stream, followed by a CBR packet with the last CBR value. This ensures that the trace decoder 110 knows that some information (in this case, time and previous frequency) was lost, but also ensures that the trace decoder 110 knows the correct frequency to apply to trace packets going forward.

Figure 5A:
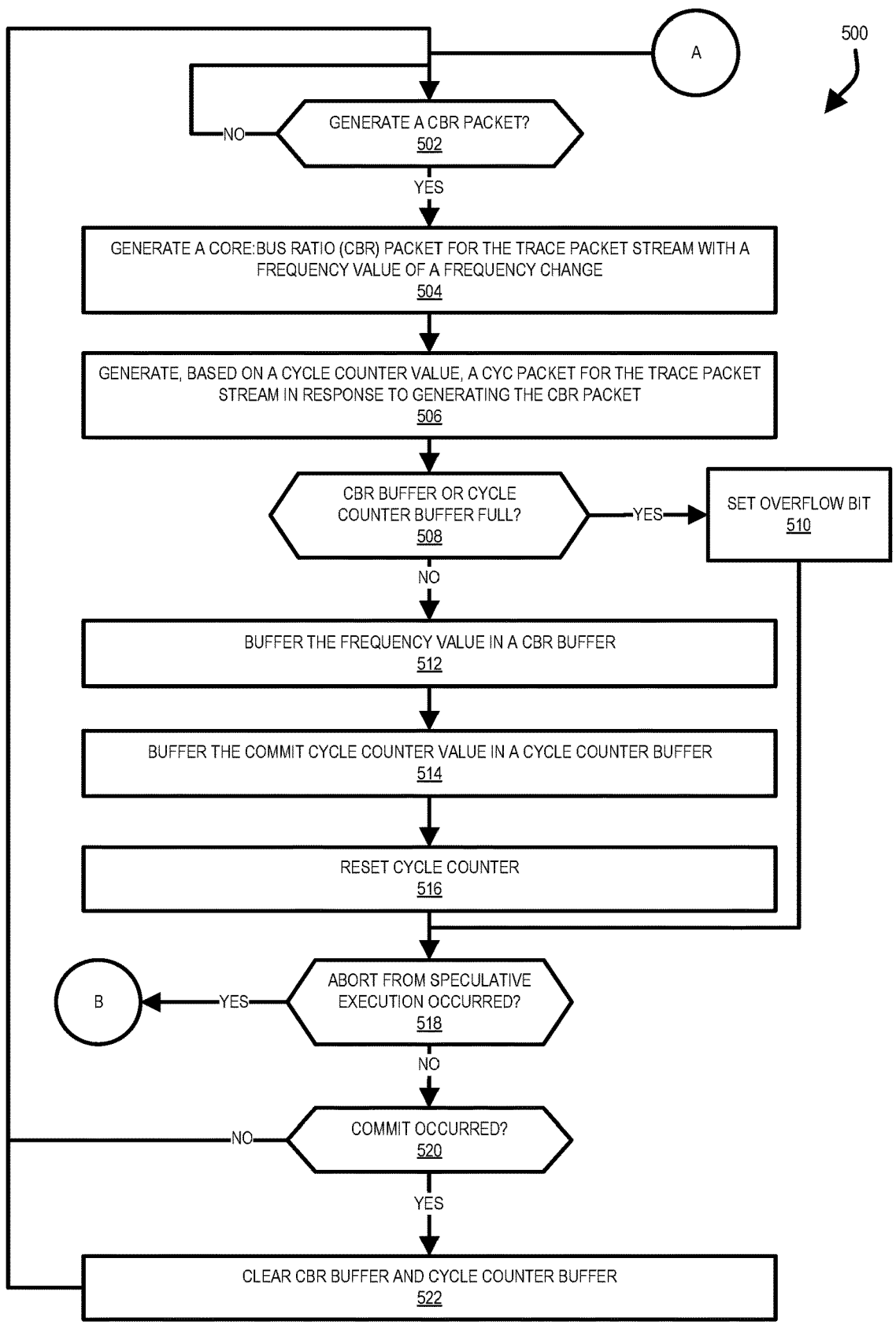
FIGS. 5A and 5B shows a method for managing state information for a core, and in particular managing cycle and frequency accounting in the core, upon an abort, according to one example embodiment.
Figure 5B:
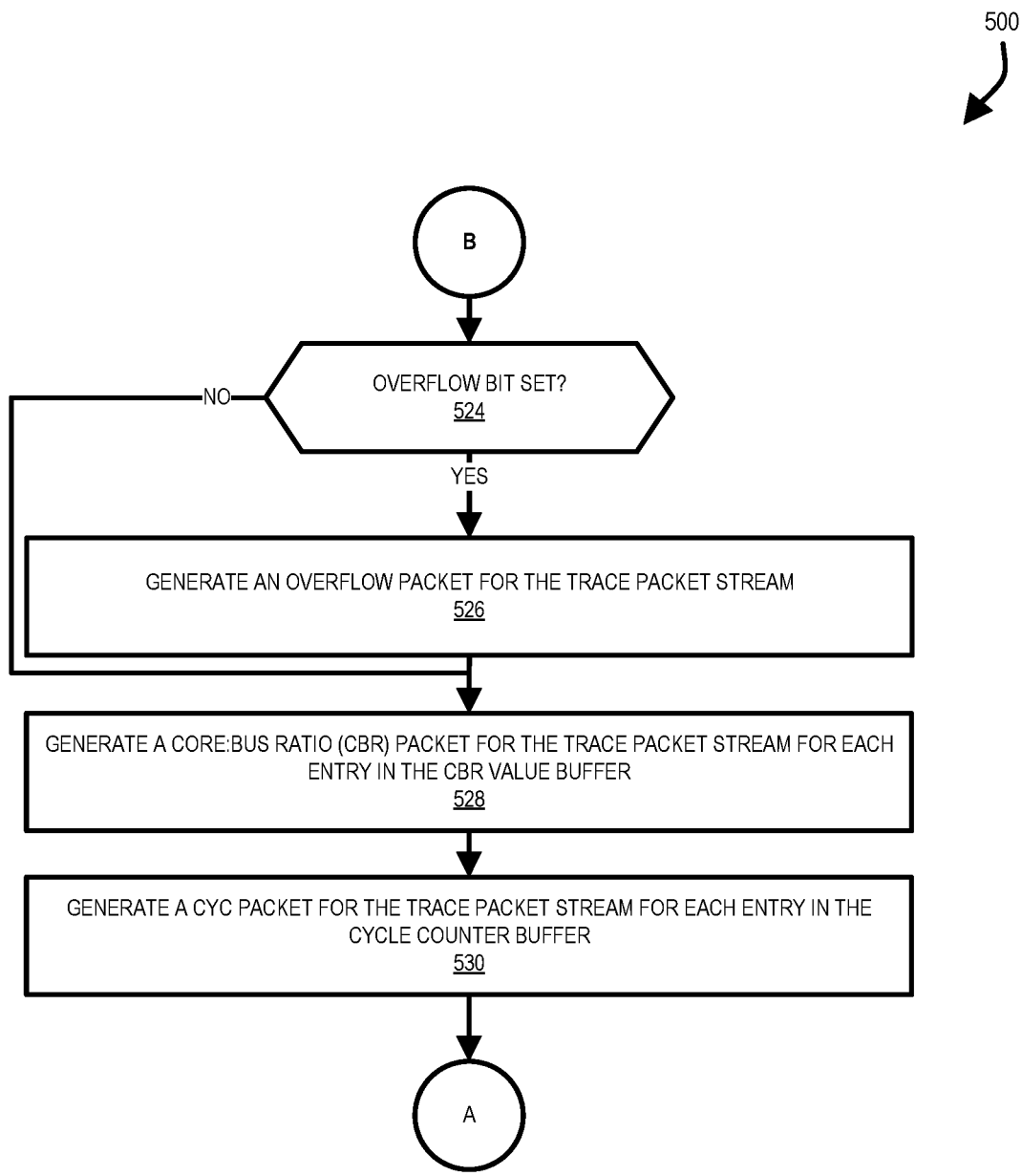

Turning now to FIGS. 5A and 5B, a method 500 will be described for managing state information for the core 104A and, in particular, managing cycle and frequency accounting in the core 104A upon an abort, according to one example embodiment. As shown in FIG. 5A, the method 500 may commence at operation 502 with the trace logic 102 determining if a CBR packet is to be generated. For example, as described above, a CBR packet is determined to be generated upon a clock frequency change in the core 104A or the processor 106. The trace logic 102 continually checks whether a CBR packet is to be generated (i.e., the method 500 returns to operation 502 until a CBR packet is to be generated) and upon determining that a CBR packet is to be generated, the method 500 moves to operation 504. At operation 504, the trace logic 102 generates a CBR packet for the trace packet stream with a frequency value corresponding to the frequency change in the core 104A or the processor 106. Since a CBR packet is being generated for addition to the trace packet stream, the CYC packet is also generated based on a value of a cycle counter at operation 506. For example, the CYC packet may be generated using a value of the main cycle counter 118, which is computed along with the commit cycle counter 120 according to the description above, including the method 400.

Following generation of the CBR packet and the CYC packet, the trace logic 102 determines whether a CBR buffer 122 or a cycle counter buffer 124 are full. In particular, the CBR buffer 122 and the cycle counter buffer 124 will be used to buffer/store values of (1) CBR packets and (2) CYC packets corresponding to CBR packets for recovery upon an abort. If either of these buffers are determined to be full at operation 508, the trace logic 102 sets an overflow bit at operation 510. This overflow bit will be used to generate an overflow (OVF) packet in the trace packet stream if an abort occurs such that the trace packet stream can reflect the fact that some information was excluded from the trace packet stream after an abort as a result of the CBR buffer 122 and/or the cycle counter buffer 124 being full.

Upon determining that the CBR buffer 122 and the cycle counter buffer 124 are not full, the method 500 moves to operation 512 to add the frequency value that was used for the generated CBR packet to the CBR buffer 122. At operation 514, a current value of the commit cycle counter 120 is added to the cycle counter buffer 124 and the commit cycle counter 120 is reset at operation 516.

Following (1) buffering corresponding values at operations 512 and 514 and resetting the commit cycle counter 120 at operation 516 or (2) setting the overflow bit at operation 510, the method 500 moves to operation 518. At operation 518, the trace logic 102 determines if an abort from speculative execution of instructions in the core 104A has occurred.

In response to determining that an abort has occurred, as shown in FIG. 5B, the trace logic 102 determines at operation 524 whether the overflow bit was set. When the overflow bit is set, the trace logic 102 generates an overflow packet for the trace packet stream at operation 526 along with generating (1) a CBR packet for every entry in the CBR buffer 122 at operation 528 and (2) a CYC packet for every entry in the cycle counter buffer 124 at operation 530. Accordingly, the trace packet stream includes an overflow packet to indicate that some information is not present in the trace packet stream but still includes all the buffer data from the CBR buffer 122 and the cycle counter buffer 124. Alternatively, when the overflow bit is not set, the trace logic 102 generates (1) a CBR packet for every entry in the CBR buffer 122 at operation 528 and (2) a CYC packet for every entry in the cycle counter buffer 124 at operation 530. Thereafter, the method 500 returns to operation 502.

Returning to operation 518, upon the trace logic 102 determining that speculative execution of instructions in the core 104A has not occurred, the method 500 moves to operation 520 to determine if a commit operation has occurred in the core 104A. When a commit has occurred, the CBR buffer 122 and the cycle counter buffer 124 are cleared at operation 522 and the method 500 returns to operation 502. Similarly, when a commit has not occurred, the method 500 returns to operation 502.

As described above, buffers may be used for tracking CBR and cycle information for recovering state information upon an abort. In particular, frequency and cycle counts used for CBR and CYC packets may be buffered in CBR buffers 122 and cycle count buffers 124, respectively, such that these values can be used in regenerating CBR and CYC packets for the trace packet stream upon the occurrence of an abort.

Ensuring that trace packets generated by aborted code are not emitted requires buffering the packets internally until the corresponding aborted code is committed. To track which packets in the trace packet stream (i.e., the trace information buffer 114 of the core 104A) are committed and which are not, a commit pointer 126 indicating the last commit point in the trace information buffer 114 can be maintained. When a commit instruction retires, the commit pointer 126 is updated to point to the current insertion/write point in the trace information buffer 114, such that all older packets in the trace information buffer 114 can be emitted, while younger packets can be withheld until the next commit. On an abort, a write pointer 128 associated with the trace information buffer 114, which indicates where to write/store the next packet, is moved back to the position of the last commit pointer 126. Accordingly, any packets written into the trace information buffer 114 since the last commit will be overwritten by packets generated by code that executes and retires after the abort.

As noted above, in some cases clusters of indications from multiple branches can be represented in a single packet. Because the packet stream described above provides dynamic information, conditional branches need only a taken or not-taken indication. This can be represented with a single bit such that a single TNT packet can represent multiple conditional branches (e.g., six conditional branch results are represented in a single TNT packet). In some embodiments, a set of TNT buffers may be maintained to hold these conditional branch results, until the TNT packet is transmitted to the trace decoder 110.

For example, when a transaction begins, a main TNT buffer 130 may be partially filled. Should that transaction update the main TNT buffer 130, perhaps even flushing a TNT packet into the trace packet stream, but thereafter an abort occurs, the state of the main TNT buffer 130 must be restored to the value held at the time of the last commit. To accomplish this, the main TNT buffer 130 is copied into a commit TNT buffer/register 132 on retirement of a commit instruction. If and when a transaction aborts, the commit TNT buffer 132 is either copied into the main TNT buffer 130, or a partial TNT packet is emitted with the commit TNT buffer 132, while the main TNT buffer 130 is cleared.

To summarize, during each cycle the main TNT buffer 130 is updated with results from any conditional branches that retired during this cycle (i.e., Main_TNT_Buffer=FlushTNT ? 0: Main_TNT_Buffer|NewBranchResults). Upon the occurrence of a commit, a snapshot of the main TNT buffer 130 is taken and stored in the commit TNT buffer 132 (i.e., Commit_TNT_Buffer=Main_TNT_Buffer). On an abort, the main TNT buffer 130 is rolled back to the last committed value based on the commit TNT buffer 132 (i.e., Main_TNT_Buffer=Commit_TNT_Buffer). Alternatively, on an abort a partial TNT packet may be emitted that holds the previously committed results (i.e., Emit TNT(Commit_TNT_Buffer)) and the main TNT buffer 130 is reset/cleared (i.e., Main_TNT_Buffer=0).

Figure 6:
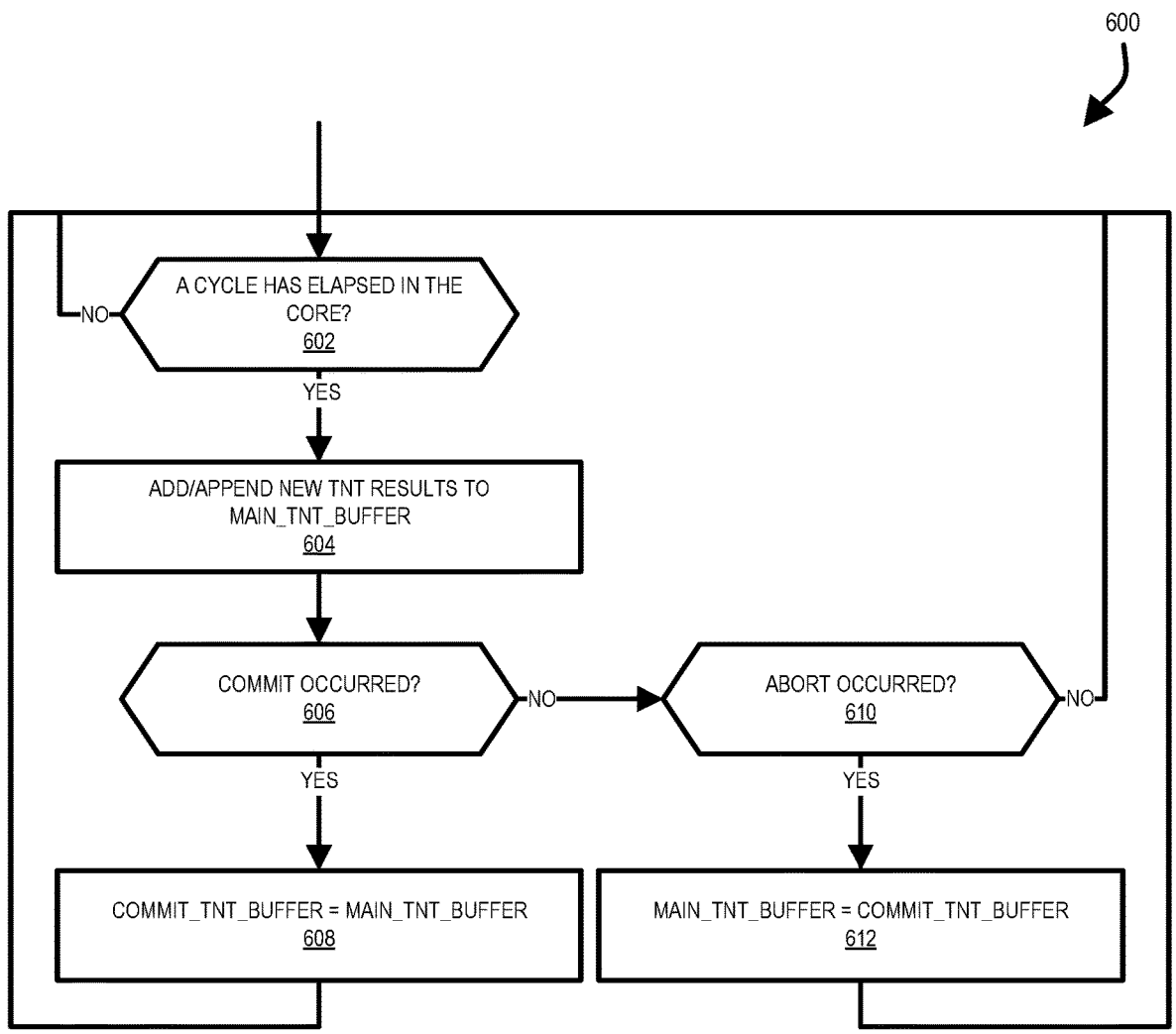
FIG. 6 shows a method for managing state information for a core, and in particular managing branch accounting in a core, upon an abort, according to one example embodiment.

Turning now to FIG. 6, a method 600 will be described for managing state information for the core 104A, and in particular managing branch accounting (e.g., TNT accounting) in the core 104A, upon an abort, according to one example embodiment. As shown in FIG. 6, the method 600 may commence at operation 602 with the trace logic 102 determining if a cycle has elapsed in the core 104A. In particular, the method 600 waits at operation 602 until a cycle has elapsed in the core 104A. Upon the occurrence of a cycle in the core 104A, the trace logic 102 add/appends all TNT results that occurred during the elapsed cycle to the main TNT buffer 130 at operation 604. As described herein, the main TNT buffer 130 stores all TNT results since the last commit operation. In particular, the main TNT buffer 130 contains a running accumulation of up to six TNT results. If more than six TNT results are reached, a TNT packet is emitted into the trace packet stream and the main TNT buffer 130 is cleared. In some embodiments, the main TNT buffer 130 may have a first/older portion that represents committed branches, and a second/younger portion that represents speculative (non-committed) branches.

At operation 606, the trace logic 102 determines if a commit operation has occurred in the core 104A. When the trace logic 102 determines that a commit operation has occurred in the core 104A, the trace logic 102 sets the commit TNT buffer 132 equal to the value of the main TNT buffer 130 (i.e., Commit_TNT_Buffer=Main_TNT_Buffer) at operation 608. Accordingly, the commit TNT buffer 132 stores a snapshot of the main TNT buffer 130 such that a recover can be performed upon an abort. Thereafter, the method 600 may return to operation 602.

When the trace logic 102 determines at operation 606 that a commit operation has not occurred in the core 104A, the method 600 moves to operation 610. At operation 610, the trace logic 102 determines if an abort has occurred. When the trace logic 102 determines an abort has occurred, the trace logic 102 sets the main TNT buffer 130 equal to the value of the commit TNT buffer 132 (i.e., Main_TNT_Buffer=Commit_TNT_Buffer) at operation 612. Accordingly, the main TNT buffer 130 may begin buffering TNT results from the last commit point.

As described above, the commit TNT buffer 132 may work in conjunction with the main TNT buffer 130 to maintain accurate TNT values even in view of unexpected events, such as an abort operation. In particular, the commit TNT buffer 132 can store a snapshot of the main TNT buffer 130 in response to a commit, such that the main TNT buffer 130 can revert to this snapshot value upon occurrence of an abort (or another similar event) and begin buffering TNT values from the last commit.

In some embodiments, a multibit (e.g., 4-bit) saturating Call-Depth Counter (CDC) may be used in the core 104A, which increments on CALL retirement and decrements on RET retirement. As used herein, a CALL pushes a return address onto the stack and transfers control to a procedure and a RET pops the return address off the stack and returns control to that location following completion of the procedure. When a RET retires with a CDC value greater than zero (i.e., CDC>0) and was predicted correctly, the trace logic 102 knows that the RET target is consistent with the call stack and hence is predictable by the trace decoder 110. In that case, the trace logic 102 can compress the RET by adding a single bit to a TNT packet to indicate the presence of a well-behaved RET, rather than inserting a multi-byte TIP packet that provides the RET target.

If CALLs and RETs retire during a transaction that is aborted, the CDC value will need to be restored to its value at the last commit point. To accomplish this, a main CDC value is copied into a commit CDC buffer/register 136 on retirement of a commit instruction. If and when a transaction aborts, the commit CDC value in the CDC buffer is used as the main CDC value 134. In particular, during each cycle, the main CDC value 134 is reset (e.g., Main_CDC=0) upon the occurrence of a reset and is otherwise set equal to Min(Max(Main_CDC+Num_CALLs, 15)−Num_RETs, 0). In particular, in a single cycle, the core 104A could CALL, RET, CALL, and RET. Accordingly, the call stack would be back to where it started. However, it is difficult in every cycle to look at the exact sequence of CALLs and RETs. Thus, the number of CALLs is added up to the current depth and then the number of RETs are subtracted from this sum. In the above example, this would provide a consistent value (i.e., Main_CDC+2−2=Main_CDC). However, if the main CDC value 134 was fourteen and could only be incremented up to 15, an issue arises. In particular, the system cannot determine if a CALL, RET, CALL, and RET was performed or if a CALL, CALL, RET, and RET was performed. Thus, two is added to the current value of the main CDC value 134 (i.e., 14+2), but has a maximum value of fifteen, and thereafter two is subtracted from the main CDC value 134 to account for the RETs (i.e., Main_CDC−2=13). The underreporting of the main CDC value 134 means that a RET is arrived at when the main CDC value 134 is zero, which could have been compressed. However, the compression is not performed because the main CDC value 134 is incorrect when an attempt was made to get to the value sixteen.

Figure 7:
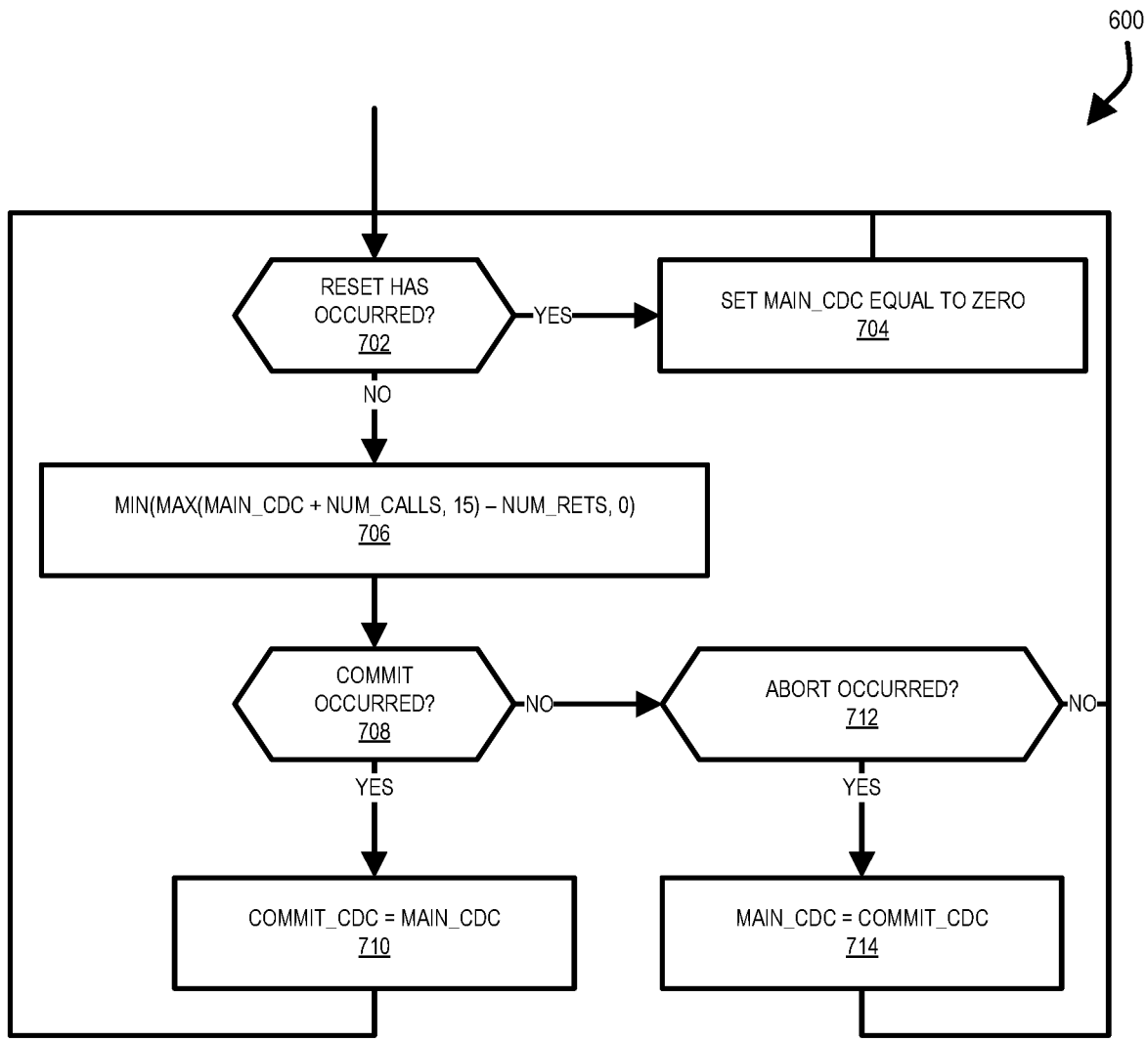
FIG. 7 shows a method for managing state information for a core, and in particular managing a Call-Depth Counter (CDC) in a core, upon an abort, according to one example embodiment.

Turning now to FIG. 7, a method 700 will be described for managing state information for the core 104A, and in particular managing CDC values in the core 104A, upon an abort, according to one example embodiment. As shown in FIG. 7, the method 700 may commence at operation 702 with the trace logic 102 determining if a reset has occurred for the main CDC value 134. In response to determining that a reset is to occur, the method 700 moves to operation 704 to reset the main CDC value 134 (i.e., Main_CDC=0) and thereafter returns to operation 702.

Conversely, upon determining that a reset has not occurred, the method 700 moves to operation 706. At operation 706, the trace logic 102 sets the main CDC value 134 equal to Min(Max(Main_CDC+Num_CALLs, 15)−Num_RETs, 0), where Num_CALLS are the number of outstanding CALLs and Num_RETs are the number of RETs. Thereafter, the trace logic 102 determines at operation 708 whether a commit operation has occurred in the core 104A. When the trace logic 102 determines that a commit operation has occurred in the core 104A, the trace logic 102 sets the commit CDC value 136 equal to the value of the main CDC value 134 (i.e., Commit_CDC=Main_CDC) at operation 710. Accordingly, the commit CDC value 136 stores a snapshot of the main CDC value 134 such that a recover can be performed upon an abort. Thereafter, the method may return to operation 702.

When the trace logic 102 determines at operation 708 that a commit operation has not occurred in the core 104A, the method 700 moves to operation 712. At operation 712, the trace logic 102 determines if an abort has occurred. When the trace logic 102 determines an abort has occurred, the trace logic 102 sets the main CDC value 134 equal to the commit CDC value 136 (i.e., Main_CDC=Commit_CDC) at operation 714. Accordingly, the main CDC value 134 may use the CDC value from the last commit point.

As described above, the commit CDC value 136 may work in conjunction with the main CDC value 134 to maintain an accurate CDC even in view of unexpected events, such as an abort operation. In particular, the commit CDC value 136 can store a snapshot of the main CDC value 134 in response to a commit, such that the main CDC value 134 can revert to this snapshot value upon occurrence of an abort (or another similar event) and begin accounting for CALLs and RETs from the last commit.

Figure 8:
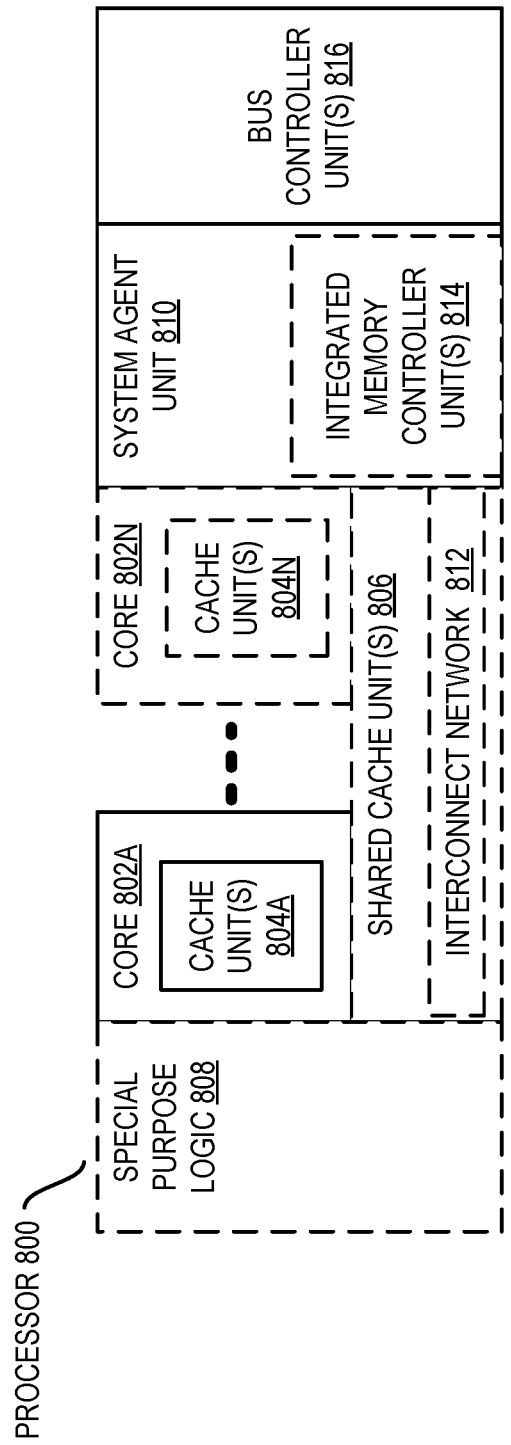
FIG. 8 is a block diagram of a processor that may have more than one core, may have an integrated memory controller, and may have integrated graphics according to example embodiment.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808. In one embodiment, the processor 800 may be the processor 106 and the core 104A may be one of the cores 802A-N and the core 104B may be another of the cores 802A-N.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808 (integrated graphics logic 808 is an example of and is also referred to herein as special purpose logic), the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802A-N.

In some embodiments, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

FIGS. 9-12 are block diagrams of exemplary computer architectures that may be used to implement the embodiments described herein. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
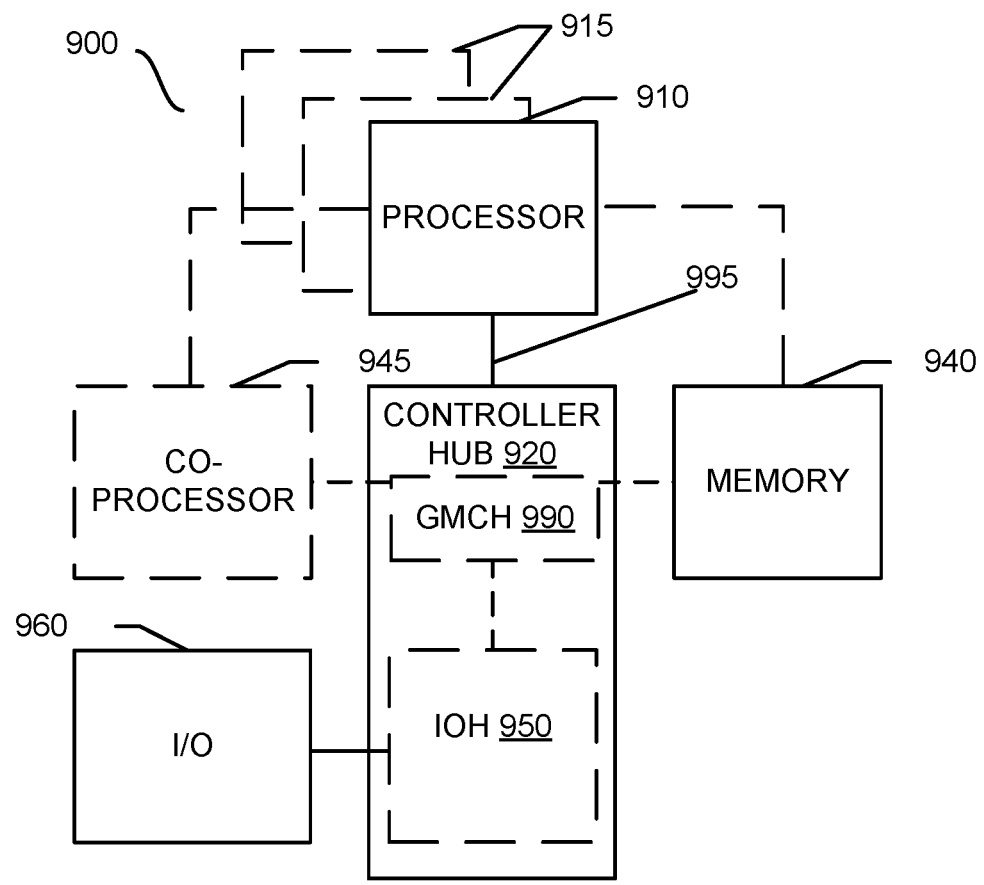
FIG. 9 shown a block diagram of a system according to example embodiment.

Referring now to FIG. 9, shown is a block diagram of a system 900 in accordance with one embodiment of the present invention. The system 900 may include one or more processors 910, 915, which are coupled to a controller hub 920. In one embodiment, the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 500. In one embodiment, the processor 106 may be one of the processors 910 and 915.

The memory 940 may be, for example, dynamic random-access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
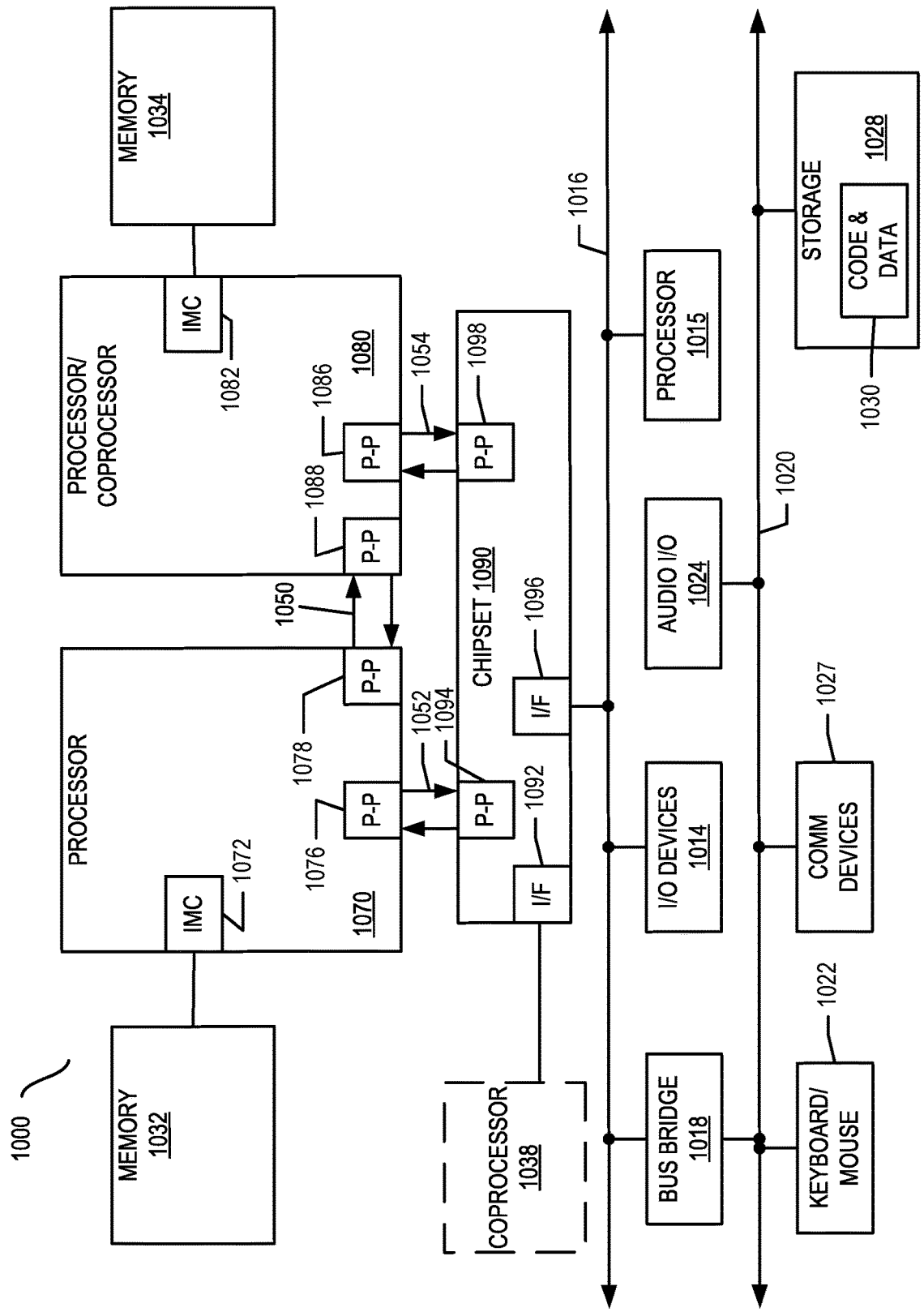
FIG. 10 is a block diagram of a first more specific exemplary system according to example embodiment.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors. In one embodiment, the processor 106 may be one of the processors 1070 and 1080.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1092. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
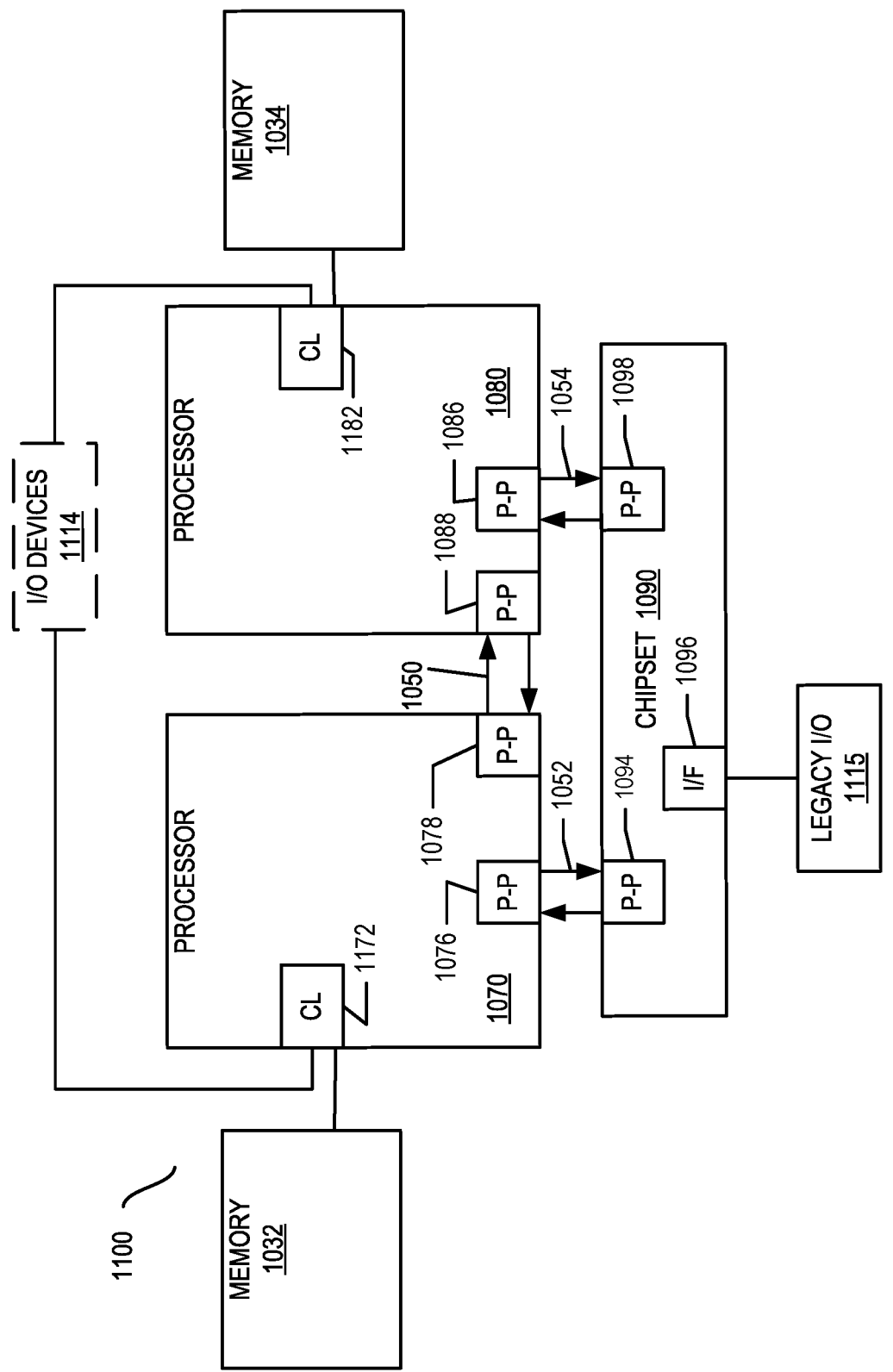
FIG. 11 is a block diagram of a second more specific exemplary system according to example embodiment.

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1172 and 1182, respectively. Thus, the CL 1172, 1182 include integrated memory controller units and include I/O control logic. FIG. 11 illustrates that not only are the memories 1032, 1034 coupled to the CL 1172, 1182, but also that I/O devices 1114 are also coupled to the control logic 1172, 1182. Legacy I/O devices 1115 are coupled to the chipset 1090.

Figure 12:
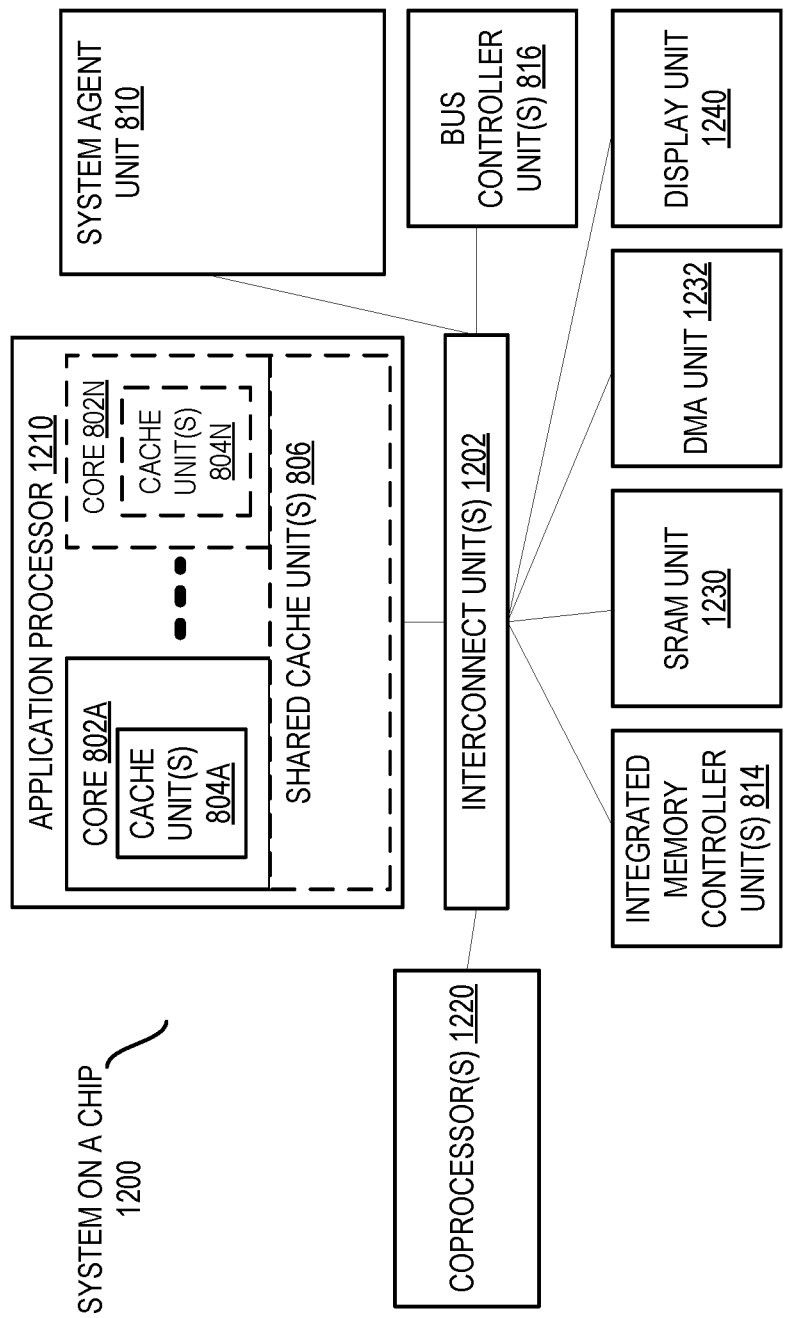
FIG. 12 is a block diagram of a System-on-a-Chip (SoC) according to example embodiment.

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 802A-N, which include cache units 804A-N, and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like. In one embodiment, the core cache 102A may be one of the cache units 804A-N, the core cache 102B may be one of the cache units 804A-N, and the shared cache 106 may be the shared cache unit 806.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FURTHER EXAMPLES

Example 1 provides a method for tracing software code executing on a core of a processor, the method comprising: generating a set of packets for a trace packet stream based on a main cycle counter, which maintains a count of cycles elapsing in the core since a packet was emitted into the trace packet stream, and a commit cycle counter, which maintains a cycle count in the core since the last commit operation, wherein the generating comprises (1) storing a value of the main cycle counter in the commit cycle counter in response to detecting a commit operation and (2) storing a value of the commit cycle counter in the main cycle counter in response to detecting an abort in the core; and emitting the set of packets from the processor into the trace packet stream for tracing execution of the software code.

Example 2 provides the substance of the exemplary method of Example 1, wherein generating the set of packets for the trace packet stream further comprises: generating a cycle packet for the trace packet stream with a value of the main cycle counter, in response to retiring an instruction of the software code; and resetting the main cycle counter in response to generating the cycle packet.

Example 3 provides the substance of the exemplary method of Example 1, wherein generating the set of packets for the trace packet stream further comprises: determining whether a cycle has elapsed in the core; and setting, in response to determining that a cycle has elapsed in the core, the value of the main cycle counter to the minimum of (1) one more than a current value of the main cycle counter and (2) a limit of the main cycle counter.

Example 4 provides the substance of the exemplary method of Example 3, wherein generating the set of packets for the trace packet stream further comprises: setting, in response to determining that a cycle has elapsed in the core, the value of the commit cycle counter to the minimum of (1) one more than a current value of the commit cycle counter and (2) a limit of the commit cycle counter.

Example 5 provides the substance of the exemplary method of Example 4, wherein generating the set of packets for the trace packet stream further comprises: determining whether the core is performing speculative instruction execution, wherein the setting the value of the commit cycle counter is to be performed in response to determining that the core is performing speculative instruction execution.

Example 6 provides the substance of the exemplary method of Example 4, wherein generating the set of packets for the trace packet stream further comprises: generating an overflow packet for the trace packet stream in response to setting the commit cycle counter to the limit of the commit cycle counter and thereafter detecting an abort.

Example 7 provides the substance of the exemplary method of Example 1, further comprising: storing, in a trace information buffer, the set of trace packets of the trace packet stream prior to emission from the processor; setting a commit pointer to point to a last packet in the set of packets that has been committed, wherein packets in the set of packets older than the last packet are available for emission from the processor and packets in the set of packets younger than the last packet are unavailable for emission from the processor; setting a write pointer to point to a next write point in the trace information buffer; and setting the write pointer to a position of the commit pointer upon an abort.

Example 8 provides the substance of the exemplary method of Example 1, further comprising: updating, during each cycle of the core, a main take-not-taken (TNT) buffer with indications of all conditional branches that retired during the cycle; setting, in response to a commit, a commit TNT buffer equal to the main TNT buffer; and setting, in response to an abort, the main TNT buffer equal to the commit TNT buffer.

Example 9 provides a non-transitory computer readable medium that stores instructions, which when executed by a processor, cause the processor to: generate a set of packets for a trace packet stream based on a main cycle counter, which maintains a count of cycles elapsing in the core since a packet was emitted into the trace packet stream, and a commit cycle counter, which maintains a cycle count in the core since the last commit operation, wherein the generating comprises (1) storing a value of the main cycle counter in the commit cycle counter in response to detecting a commit operation and (2) storing a value of the commit cycle counter in the main cycle counter in response to detecting an abort in the core; and emit the set of packets from the processor into the trace packet stream for tracing execution of the software code.

Example 10 provides the exemplary non-transitory computer readable medium of Example 9, wherein, for generating the set of packets for the trace packet stream, the instructions further cause the processor to: generate a cycle packet for the trace packet stream with a value of the main cycle counter, in response to retiring an instruction of the software code; and reset the main cycle counter in response to generating the cycle packet.

Example 11 provides the exemplary non-transitory computer readable medium of Example 9, wherein, for generating the set of packets for the trace packet stream, the instructions further cause the processor to: determine whether a cycle has elapsed in the core; and set, in response to determining that a cycle has elapsed in the core, the value of the main cycle counter to the minimum of (1) one more than a current value of the main cycle counter and (2) a limit of the main cycle counter.

Example 12 provides the exemplary non-transitory computer readable medium of Example 11, wherein, for generating the set of packets for the trace packet stream, the instructions further cause the processor to: set, in response to determining that a cycle has elapsed in the core, the value of the commit cycle counter to the minimum of (1) one more than a current value of the commit cycle counter and (2) a limit of the commit cycle counter.

Example 13 provides the exemplary non-transitory computer readable medium of Example 12, wherein, for generating the set of packets for the trace packet stream, the instructions further cause the processor to: determining whether the core is performing speculative instruction execution, wherein the setting the value of the commit cycle counter is to be performed in response to determining that the core is performing speculative instruction execution.

Example 14 provides the exemplary non-transitory computer readable medium of Example 12, wherein, for generating the set of packets for the trace packet stream, the instructions further cause the processor to: generate an overflow packet for the trace packet stream in response to setting the commit cycle counter to the limit of the commit cycle counter and thereafter detecting an abort.

Example 15 provides the exemplary non-transitory computer readable medium of Example 9, wherein the instructions further cause the processor to: store, in a trace information buffer, the set of trace packets of the trace packet stream prior to emission from the processor; set a commit pointer to point to a last packet in the set of packets that has been committed, wherein packets in the set of packets older than the last packet are available for emission from the processor and packets in the set of packets younger than the last packet are unavailable for emission from the processor; set a write pointer to point to a next write point in the trace information buffer; and set the write pointer to a position of the commit pointer upon an abort.

Example 16 provides the exemplary non-transitory computer readable medium of Example 9, wherein the instructions further cause the processor to: update, during each cycle of the core, a main take-not-taken (TNT) buffer with indications of all conditional branches that retired during the cycle; set, in response to a commit, a commit TNT buffer equal to the main TNT buffer; and set, in response to an abort, the main TNT buffer equal to the commit TNT buffer.

Example 17 provides a system comprising: a trace decoder; and a processing core, including trace logic to manage a main cycle counter, which maintains a count of cycles elapsing in the processing core since a packet was emitted into a trace packet stream, and a commit cycle counter, which maintains a cycle count in the processing core since the last commit operation, wherein the trace logic to (1) store a value of the main cycle counter in the commit cycle counter in response to detecting a commit operation, (2) store a value of the commit cycle counter in the main cycle counter in response to detecting an abort in the processing core, and (3) generate a set of packets based on the main cycle counter and the commit cycle counter for the trace packet stream, which includes dynamic trace information for execution of the software code on the processing core, and wherein the trace decoder to generate a trace flow that describes execution of the software code on the processing core based on the trace packet stream.

Example 18 provides the exemplary system of Example 17, wherein the trace logic is to further generate a cycle packet for the trace packet stream with a value of the main cycle counter, in response to retiring an instruction of the software code and reset the main cycle counter in response to generating the cycle packet.

Example 19 provides the exemplary system of Example 17, wherein the trace logic is to further: determine whether a cycle has elapsed in the processing core and set, in response to determining that a cycle has elapsed in the processing core, the value of the main cycle counter to the minimum of (1) one more than a current value of the main cycle counter and (2) a limit of the main cycle counter.

Example 20 provides the exemplary system of Example 19, wherein the trace logic is to further set, in response to determining that a cycle has elapsed in the processing core, the value of the commit cycle counter to the minimum of (1) one more than a current value of the commit cycle counter and (2) a limit of the commit cycle counter.

What is claimed is:

1. A method for tracing software code executing on a core of a processor, the method comprising:
generating a set of packets for a trace packet stream based on a main cycle counter, which maintains a count of cycles elapsing in the core since a packet was emitted into the trace packet stream, and a commit cycle counter, which maintains a cycle count in the core since the last commit operation, wherein the generating comprises (1) storing a value of the main cycle counter in the commit cycle counter in response to detecting a commit operation and (2) storing a value of the commit cycle counter in the main cycle counter in response to detecting an abort in the core;

emitting the set of packets from the processor into the trace packet stream for tracing execution of the software code;

updating, during each cycle of the core, a main take-not-taken (TNT) buffer with indications of all conditional branches that retired during the cycle;

setting, in response to a commit, a commit TNT buffer equal to the main TNT buffer; and setting, in response to an abort, the main TNT buffer equal to the commit TNT buffer.

2. The method of claim 1, wherein generating the set of packets for the trace packet stream further comprises:

generating a cycle packet for the trace packet stream with a value of the main cycle counter, in response to retiring an instruction of the software code; and resetting the main cycle counter in response to generating the cycle packet.

3. The method of claim 1, wherein generating the set of packets for the trace packet stream further comprises:

determining whether a cycle has elapsed in the core; and setting, in response to determining that a cycle has elapsed in the core, the value of the main cycle counter to the minimum of (1) one more than a current value of the main cycle counter and (2) a limit of the main cycle counter.

4. The method of claim 3, wherein generating the set of packets for the trace packet stream further comprises:

setting, in response to determining that a cycle has elapsed in the core, the value of the commit cycle counter to the minimum of (1) one more than a current value of the commit cycle counter and (2) a limit of the commit cycle counter.

5. The method of claim 4, wherein generating the set of packets for the trace packet stream further comprises:

determining whether the core is performing speculative instruction execution, wherein the setting the value of the commit cycle counter is to be performed in response to determining that the core is performing speculative instruction execution.

6. The method of claim 4, wherein generating the set of packets for the trace packet stream further comprises:

generating an overflow packet for the trace packet stream in response to setting the commit cycle counter to the limit of the commit cycle counter and thereafter detecting an abort.

7. The method of claim 1, further comprising:

storing, in a trace information buffer, the set of packets of the trace packet stream prior to emission from the processor;

setting a commit pointer to point to a last packet in the set of packets that has been committed, wherein packets in the set of packets older than the last packet are available for emission from the processor and packets in the set of packets younger than the last packet are unavailable for emission from the processor;

setting a write pointer to point to a next write point in the trace information buffer; and setting the write pointer to a position of the commit pointer upon an abort.

8. A non-transitory computer readable medium that stores instructions, which when executed by a processor, cause the processor to:

generate a set of packets for a trace packet stream based on a main cycle counter, which maintains a count of cycles elapsing in a core of the processor since a packet was emitted into the trace packet stream, and a commit cycle counter, which maintains a cycle count in the core since the last commit operation, wherein the generating comprises (1) storing a value of the main cycle counter in the commit cycle counter in response to detecting a commit operation and (2) storing a value of the commit cycle counter in the main cycle counter in response to detecting an abort in the core, wherein generating the set of packets includes:

determining whether a cycle has elapsed in the core, setting, in response to determining that a cycle has elapsed in the core, the value of the commit cycle counter to the minimum of (1) one more than a current value of the commit cycle counter and (2) a limit of the commit cycle counter, and generating an overflow packet for the trace packet stream in response to setting the commit cycle counter to the limit of the commit cycle counter and thereafter detecting an abort; and emit the set of packets from the processor into the trace packet stream for tracing execution of the software code.

9. The non-transitory computer readable medium of claim 8, wherein, for generating the set of packets for the trace packet stream, the instructions further cause the processor to:

generate a cycle packet for the trace packet stream with a value of the main cycle counter, in response to retiring an instruction of the software code; and reset the main cycle counter in response to generating the cycle packet.

10. The non-transitory computer readable medium of claim 8, wherein, for generating the set of packets for the trace packet stream, the instructions further cause the processor to:

set, in response to determining that a cycle has elapsed in the core, the value of the main cycle counter to the minimum of (1) one more than a current value of the main cycle counter and (2) a limit of the main cycle counter.

11. The non-transitory computer readable medium of claim 8, wherein, for generating the set of packets for the trace packet stream, the instructions further cause the processor to:

determine whether the core is performing speculative instruction execution, wherein the setting the value of the commit cycle counter is to be performed in response to determining that the core is performing speculative instruction execution.

12. The non-transitory computer readable medium of claim 8, wherein the instructions further cause the processor to:

store, in a trace information buffer, the set of packets of the trace packet stream prior to emission from the processor;

set a commit pointer to point to a last packet in the set of packets that has been committed, wherein packets in the set of packets older than the last packet are available for emission from the processor and packets in the set of packets younger than the last packet are unavailable for emission from the processor;

set a write pointer to point to a next write point in the trace information buffer; and set the write pointer to a position of the commit pointer upon an abort.

13. The non-transitory computer readable medium of claim 8, wherein the instructions further cause the processor to:
update, during each cycle of the core, a main take-not-taken (TNT) buffer with indications of all conditional branches that retired during the cycle;
set, in response to a commit, a commit TNT buffer equal to the main TNT buffer; and
set, in response to an abort, the main TNT buffer equal to the commit TNT buffer.

14. A system comprising:
a trace decoder; and
a processing core, including trace logic to manage a main cycle counter, which maintains a count of cycles elapsing in the processing core since a packet was emitted into a trace packet stream, and a commit cycle counter, which maintains a cycle count in the processing core since the last commit operation,
wherein the trace logic is to (1) store a value of the main cycle counter in the commit cycle counter in response to detecting a commit operation, (2) store a value of the commit cycle counter in the main cycle counter in response to detecting an abort in the processing core, and (3) generate a set of packets based on the main cycle counter and the commit cycle counter for the trace packet stream, which includes dynamic trace information for execution of the software code on the processing core,
wherein the trace logic is to further (1) update, during each cycle of the processing core, a main take-not-taken (TNT) buffer with indications of all conditional branches that retired during the cycle, (2) set, in response to a commit, a commit TNT buffer equal to the main TNT buffer, and (3) set, in response to an abort, the main TNT buffer equal to the commit TNT buffer; and
wherein the trace decoder is to generate a trace flow that describes execution of the software code on the processing core based on the trace packet stream.

15. The system of claim 14, wherein the trace logic is to further generate a cycle packet for the trace packet stream with a value of the main cycle counter, in response to retiring an instruction of the software code and reset the main cycle counter in response to generating the cycle packet.

16. The system of claim 14, wherein the trace logic is to further: determine whether a cycle has elapsed in the processing core and set, in response to determining that a cycle has elapsed in the processing core, the value of the main cycle counter to the minimum of (1) one more than a current value of the main cycle counter and (2) a limit of the main cycle counter.

17. The system of claim 16, wherein the trace logic is to further set, in response to determining that a cycle has elapsed in the processing core, the value of the commit cycle counter to the minimum of (1) one more than a current value of the commit cycle counter and (2) a limit of the commit cycle counter.

* * * * *